(12) United States Patent
Bagherzadeh et al.

(10) Patent No.: US 8,129,305 B2
(45) Date of Patent: Mar. 6, 2012

(54) CATALYST AND METHOD FOR CONVERTING NATURAL GAS TO HIGHER CARBON COMPOUNDS

(75) Inventors: Ebrahim Bagherzadeh, Sugarland, TX (US); Abbas Hassan, Sugarland, TX (US); Rayford G. Anthony, College Station, TX (US); Aziz Hassan, Sugarland, TX (US); Bedri Bozkurt, College Station, TX (US); Jubo Zhang, College Station, TX (US)

(73) Assignee: HRD Corporation, Houston, TX (US)

( * ) Notice: Subject to any disclaimer, the term of this patent is extended or adjusted under 35 U.S.C. 154(b) by 575 days.

(21) Appl. No.: 12/109,587

(22) Filed: Apr. 25, 2008

(65) Prior Publication Data

US 2008/0281136 A1 Nov. 13, 2008

Related U.S. Application Data

(60) Provisional application No. 60/913,839, filed on Apr. 25, 2007.

(51) Int. Cl.
*B01J 23/34* (2006.01)

(52) U.S. Cl. ......... 502/313; 502/241; 502/300; 502/324

(58) Field of Classification Search .................. 502/241, 502/302–303, 308–309, 313, 317
See application file for complete search history.

(56) References Cited

U.S. PATENT DOCUMENTS

| | | | |
|---|---|---|---|
| 4,522,708 A | 6/1985 | Leclercq et al. | |
| 5,336,825 A | 8/1994 | Choudhary et al. | |
| 6,022,986 A | 2/2000 | Scharbert et al. | |
| 6,071,849 A * | 6/2000 | Murata et al. | 502/305 |
| 6,090,992 A | 7/2000 | Wu et al. | |
| 6,207,609 B1 | 3/2001 | Gao et al. | |
| 6,461,539 B1 | 10/2002 | Gaffney | |
| 6,488,907 B1 | 12/2002 | Barnes et al. | |
| 6,518,476 B1 | 2/2003 | Culp et al. | |
| 6,555,721 B2 | 4/2003 | Griffiths et al. | |
| 6,596,912 B1 | 7/2003 | Lunsford et al. | |
| 6,602,920 B2 | 8/2003 | Hall et al. | |
| 6,623,720 B2 | 9/2003 | Thompson et al. | |
| 6,632,971 B2 | 10/2003 | Brown et al. | |

(Continued)

OTHER PUBLICATIONS

International Preliminary Report on Patentability—PCT/US2008/061527.

(Continued)

*Primary Examiner* — Walter D Griffin
*Assistant Examiner* — Brian McCaig
(74) *Attorney, Agent, or Firm* — Porter Hedges LLP; Timothy S. Westby

(57) ABSTRACT

A catalyst composition and process facilitates the oxidative reforming of low molecular weight hydrocarbons, such as methane, to other hydrocarbons having 2 or more carbon atoms ("$C_{2+}$ compounds"). Compositions having a formula comprising a metal, tungsten, manganese and oxygen effectively catalyze the oxidative reforming of methane with a high rate of conversion and selectivity. Controlling feed gas flow and catalyst bed temperature controls the exothermic OCM reaction, avoiding runaway reactions or coking. A single or multiple reactor system can be utilized for the oxidative reforming reactions. Using two reactors in series, catalyst embodiments produced favorable yields of $C_{2+}$ compounds, in the presence or absence of a distributed oxygen feed, and with or without interstage effluent cooling. Removal of desirable end products from the reactor effluent, followed by recycling of the residual effluent, increases the conversion to, and ultimate yield of desirable end product.

7 Claims, 8 Drawing Sheets

Experimental Setup with a tubular reactor

Experimental Setup with two reactors

U.S. PATENT DOCUMENTS

| | | |
|---|---|---|
| 6,797,851 B2 | 9/2004 | Martens et al. |
| 6,852,303 B2 | 2/2005 | Seegopaul et al. |
| 6,887,455 B2 | 5/2005 | Carpenter et al. |
| 6,930,068 B2 | 8/2005 | Kaneko et al. |
| 7,291,321 B2 | 11/2007 | Bagherzadeh et al. |
| 2004/0267079 A1 | 12/2004 | Mamedov et al. |
| 2006/0155157 A1 | 7/2006 | Zarrinpashne et al. |

OTHER PUBLICATIONS

Journal of Catalysis 180:85-100, 1999, Claridge, J.B., A.P.E. York, A.J. Brungs, C. Marquez-Alvarez, J. Sloan, S.C. Tsang and M.L.H. Green.

Applied Catalysis A: General 155:L1-L7, 1997, Cordi, E.M., S. Pak, M.P. Rosynek, and J.H. Lunsford.

Science 264: 1563-1566, Jun. 10, 1994, Jiang, Y., I.V. Yentekakis, and C.G. Vayenas.

Applied Catalysis A: General 146:391-400, 1996, Machocki, A.

3rd World Congress on Oxidation Catalysis, pp. 711-720, in R.K. Grasselli, S.T. Pyama, A.M. Gaffney and J.E. Lyons (Editors); Elsevier Science B.V., 1997, York, A.P.E., J.B. Claridge, C. Marquez-Alvarez, A.J. Brungs, S.C. Tsang and M.L.H. Green.

Sergei Pak, Ping Qiu, Jack H. Lunsford; "Elementary Reactions in the Oxidative Coupling of Methane over Mn/Na2WO4/MgO Catalysts" Journal of Catalysis, vol. 179, 1998, pp. 222-230, Academic Press.

Dingjun Wang, Michael P. Rosynek, Jack H. Lunsford; "Oxidative Coupling of Methane over Oxide-Supported Sodium-Manganese Catalysts" Journal of Catalysis, vol. 155, 1995, pp. 390-402, Academic Press.

A. Malekzadeh, M. Abedini, A.A. Khodadadi, M. Amini, H.K. Mishra, A.K. Dalai; "Critical Influence of Mn on low-temperature catalytic activity of Mn/Na2WO4/SiO2 Catalyst for Oxidatve Coupling of Methane" Catalysis Letters, vol. 84, Nos. 1-2, Oct. 2002, pp. 45-51, Plenum Publishing Corporation.

Ronny Neumann and Mohammad Gara; "The Manganese-Containing Polyoxometalate, [WZnMn2(ZnW9O34)2]12-, as a Remarkably Effective Catalyst for Hydrogen Peroxide Mediated Oxidations" Journal of The American Chemical Society, vol. 117, 1995, pp. 5066-5074, American Chemical Society.

International Search Report with Written Opinion—PCT/US2008/061527.

\* cited by examiner

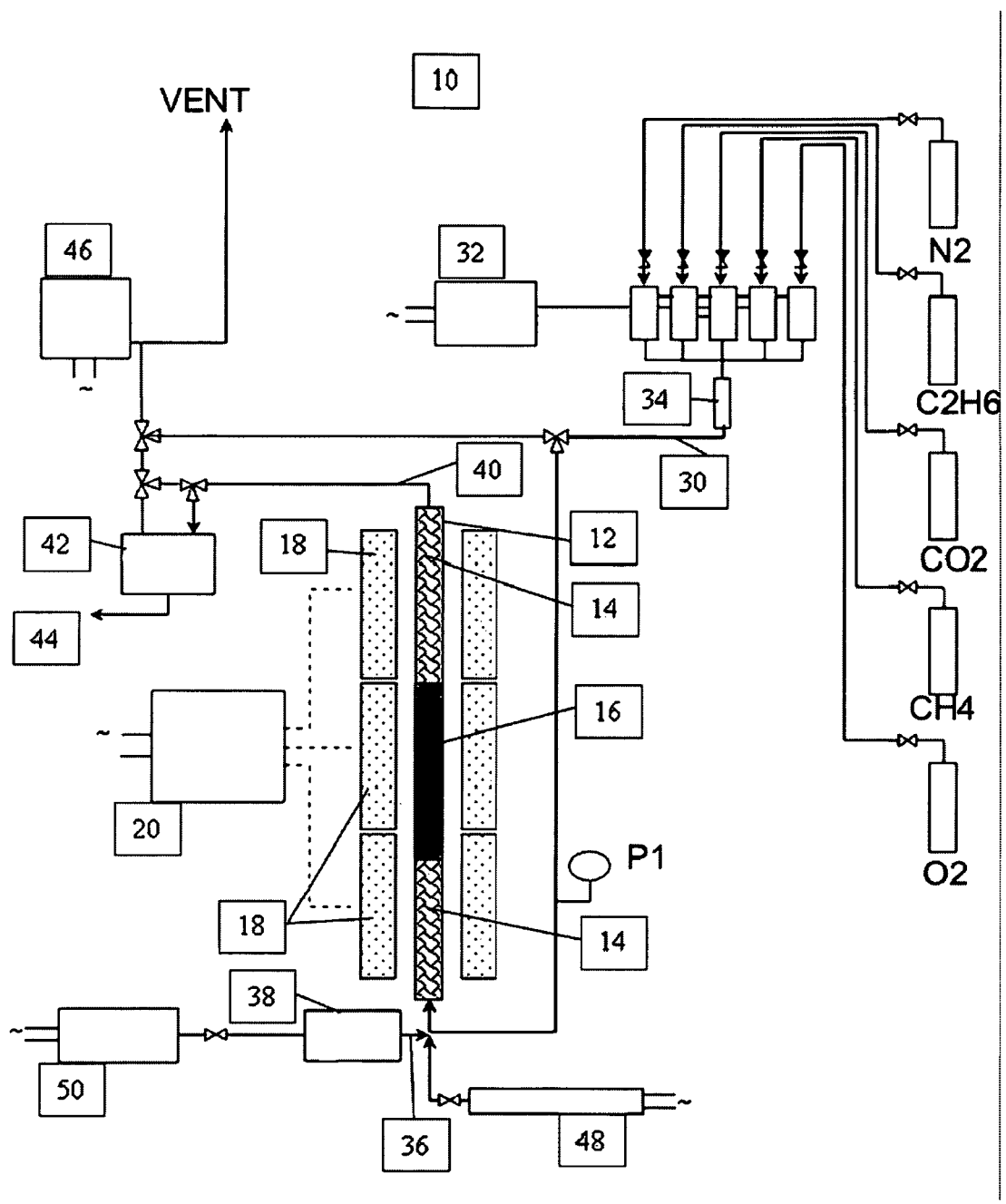
Figure 1 A: Experimental Setup with a tubular reactor

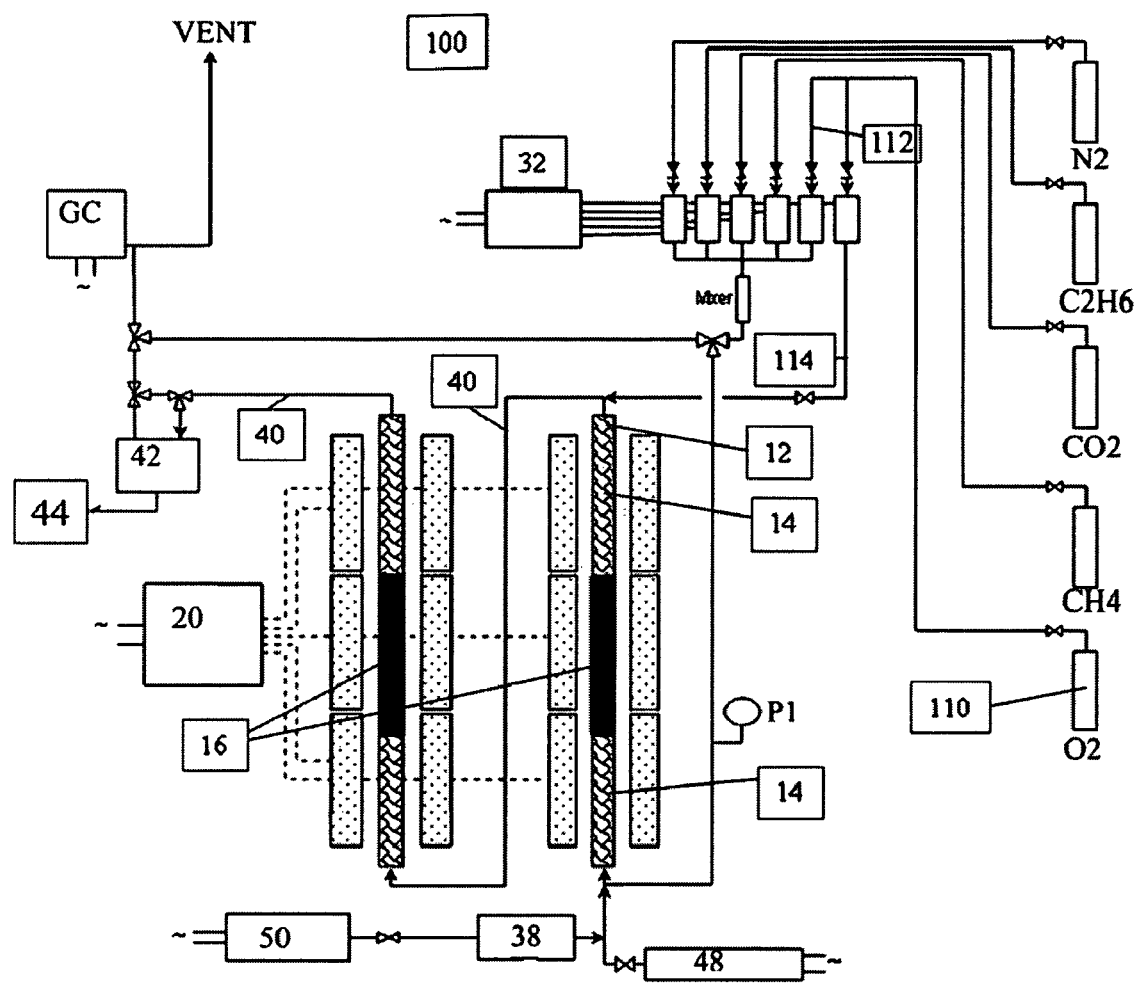
Figure 1B: Experimental Setup with two reactors

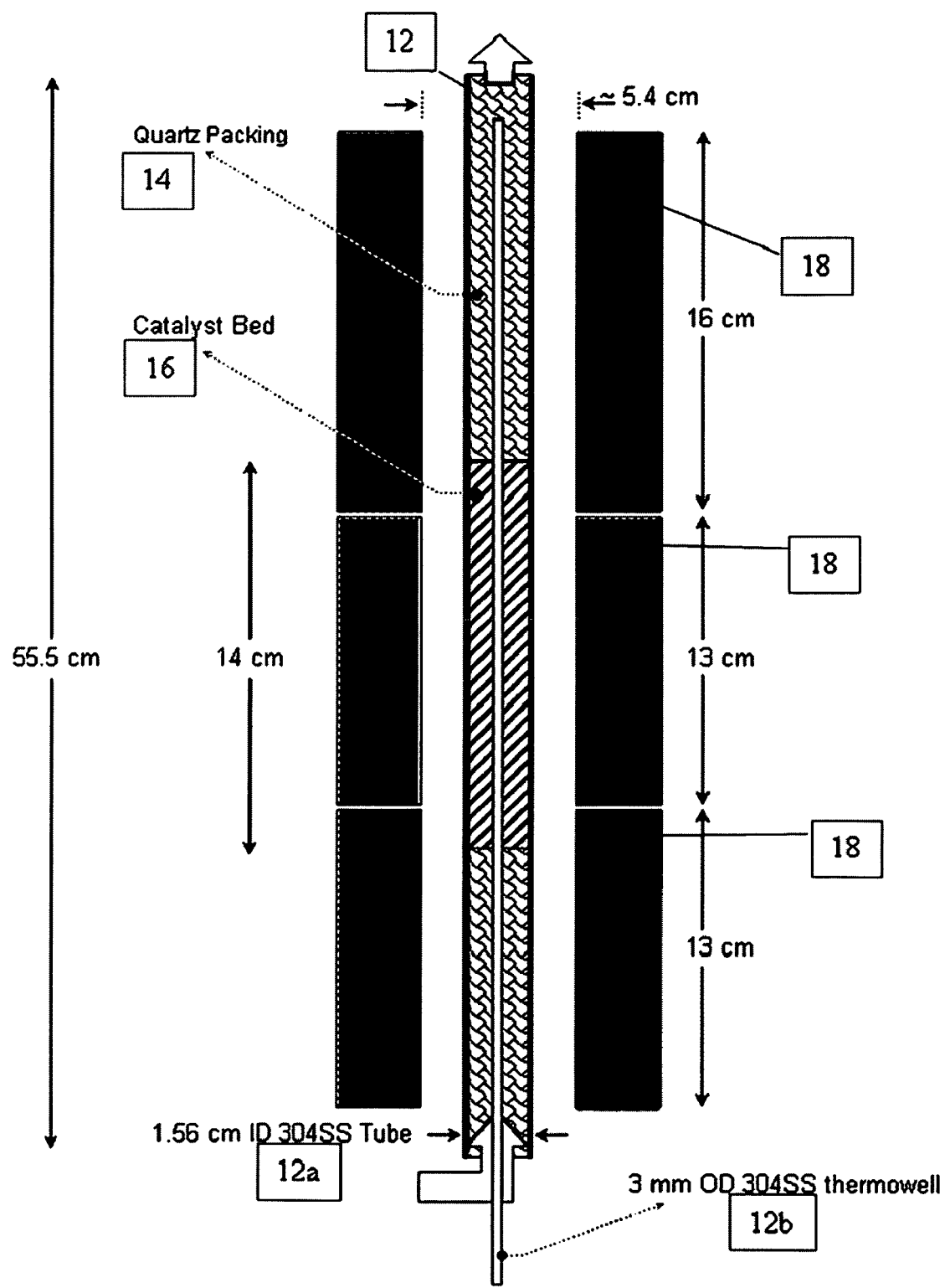
Figure 1 C: Typical configuration of reactor and furnaces

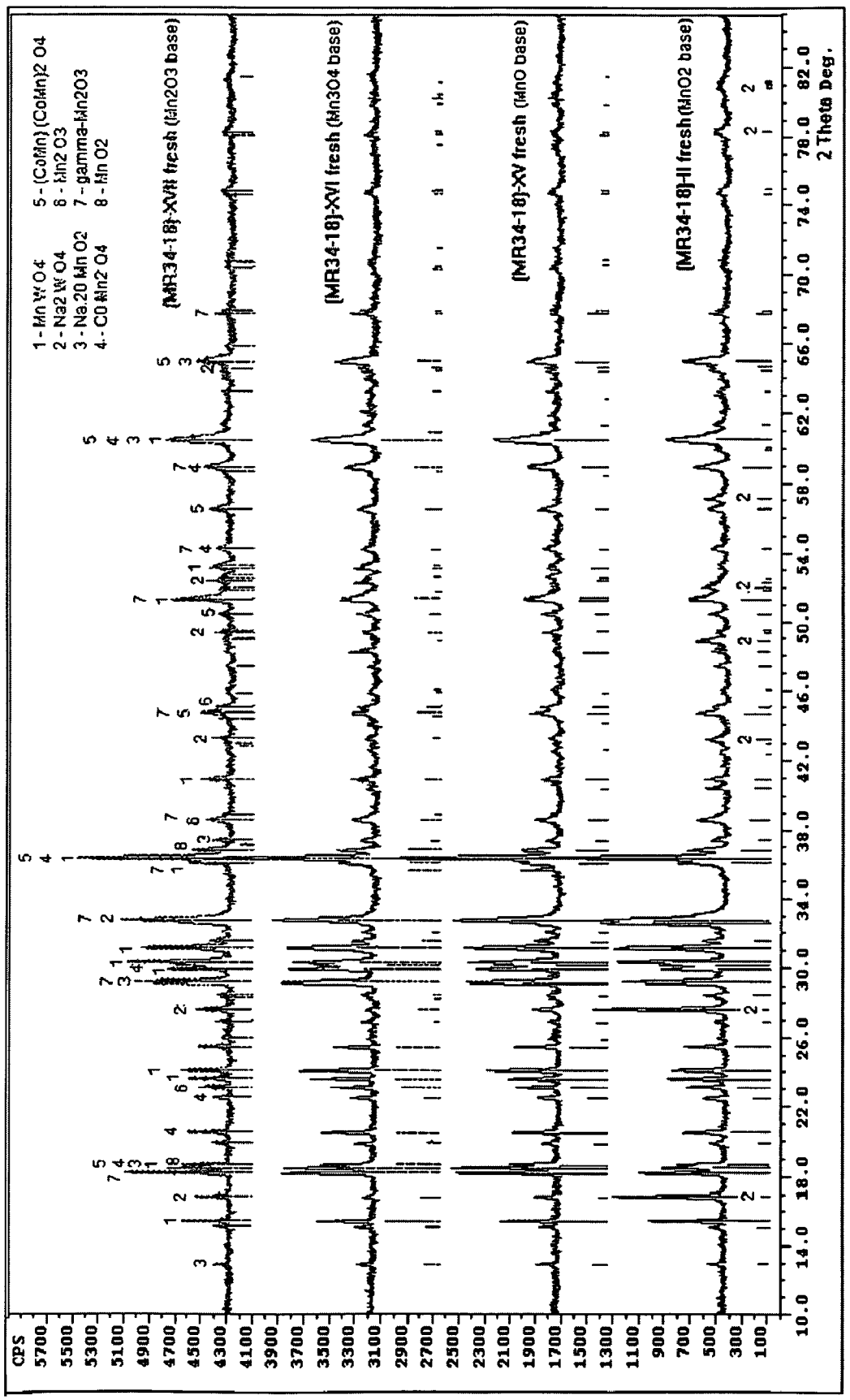
Fig. 2: XRD patterns illustrate that the same crystalline phases are observed for different sources of Manganese Oxides.

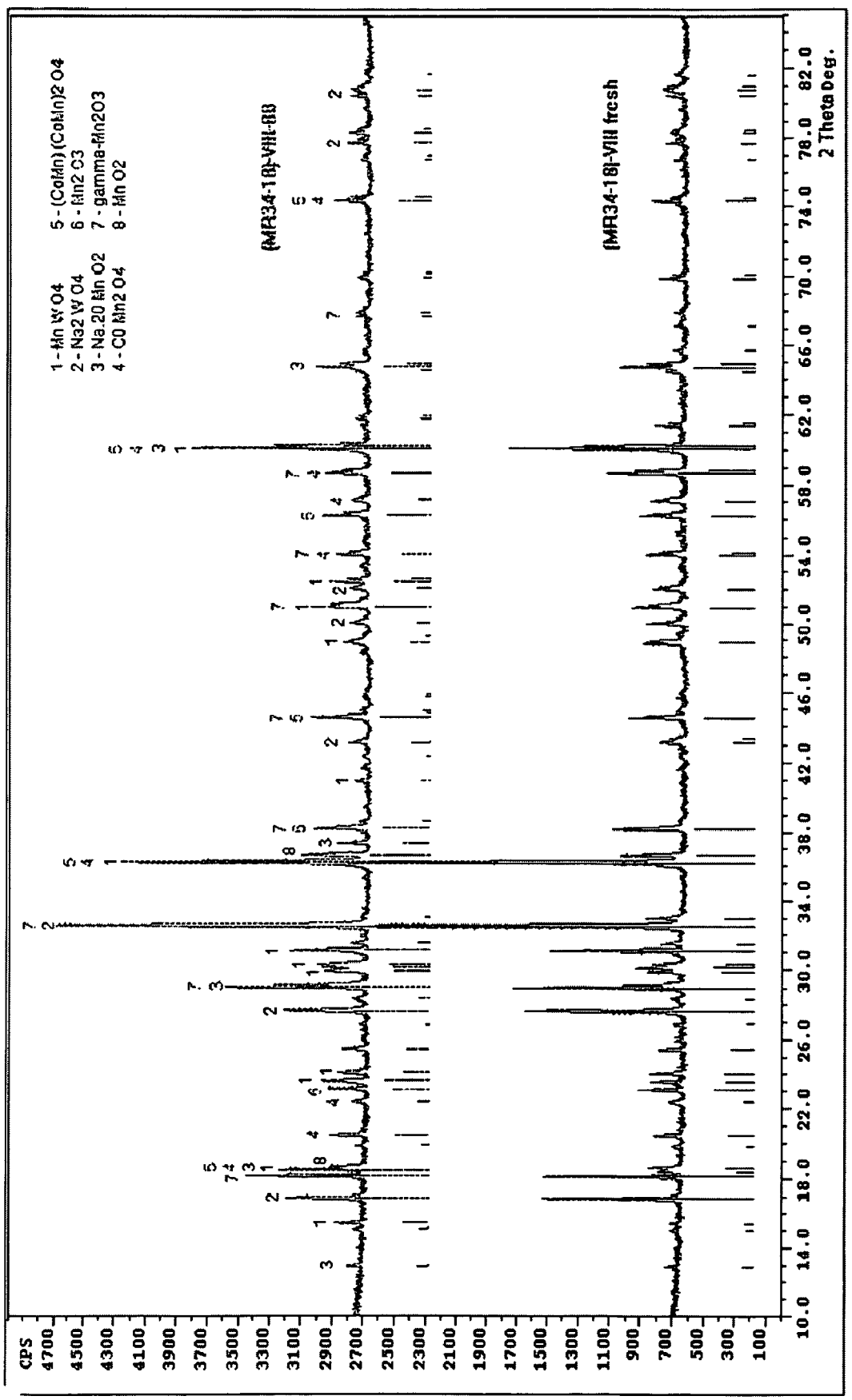
Fig. 3: XRD patterns illustrate the crystalline structures of a fresh and used OCM catalyst.

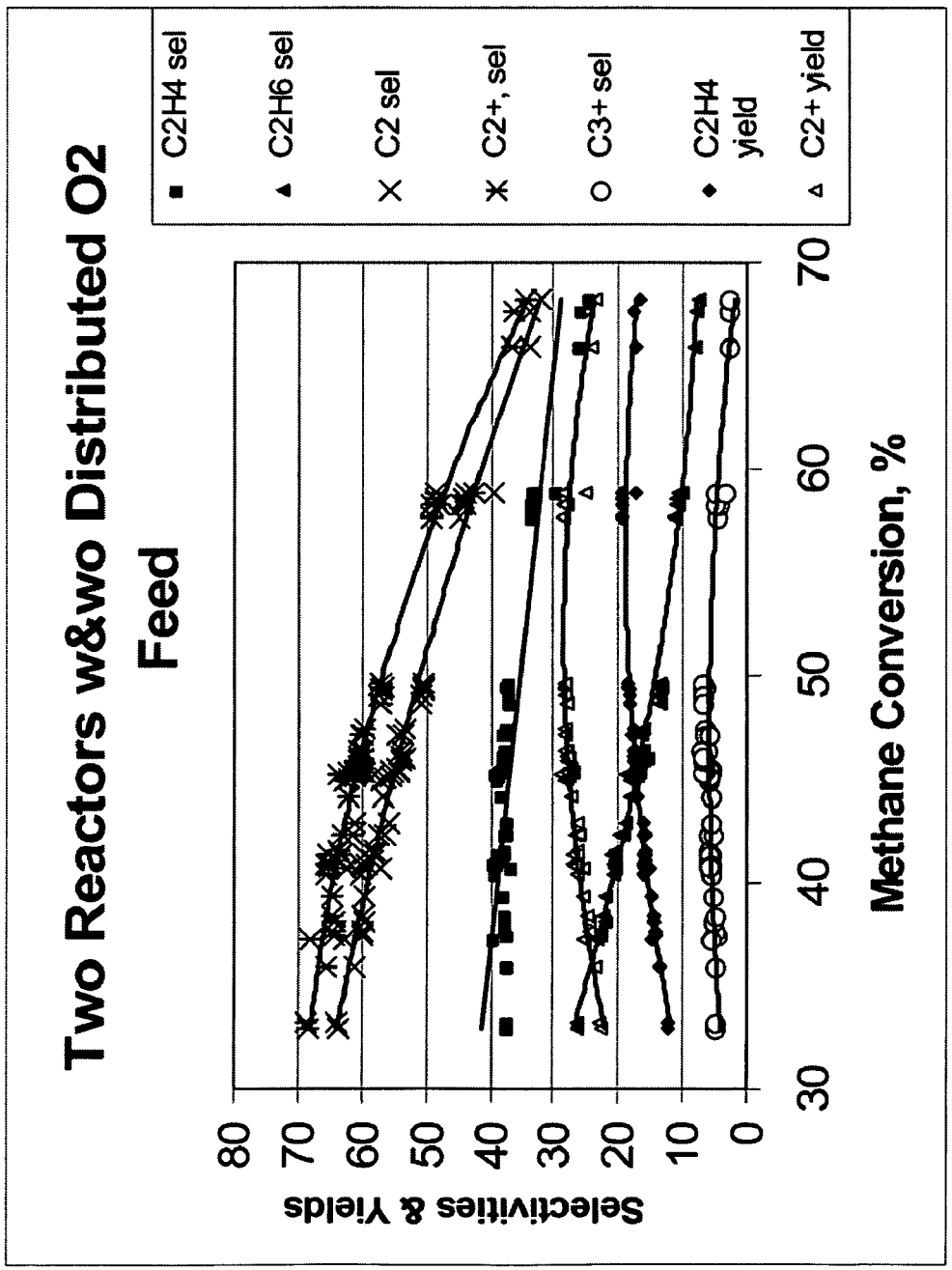
Figure 4. Reactor pressure ranged from 4 psig to 15 psig and maximum reactor temperatures were mostly approximately 800 °C with some data collected at Tmax of 829 °C to 835 °C.

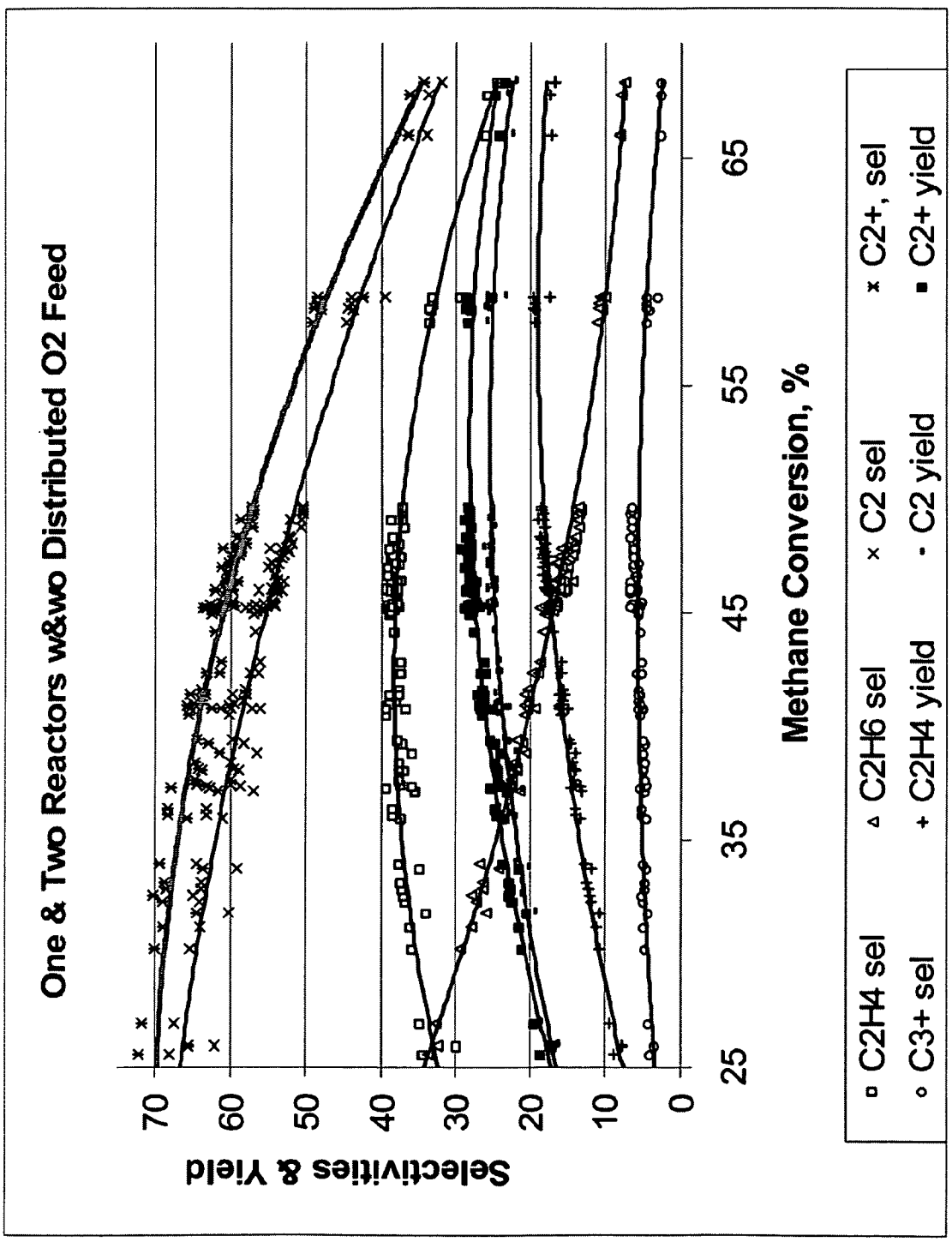
Fig 6. All of the data for MR34-18 for one and two reactor systems and with/without distributed oxygen feed are illustrated.

CATALYST AND METHOD FOR CONVERTING NATURAL GAS TO HIGHER CARBON COMPOUNDS

CROSS-REFERENCE TO RELATED APPLICATIONS

This application claims the benefit of U.S. Provisional Application For Patent, Ser. No. 60/913,839, filed 25 Apr. 2007, the contents of which are incorporated by reference herein in their entirety.

FIELD OF THE INVENTION

The present invention relates to novel catalysts and processes for producing alkenes, carbon oxides, hydrogen and other organic compounds with carbon numbers of 2 or more from alkanes (also referred to herein as paraffinic alkanes) such as methane ($CH_4$) that are found as the major component in most natural gas streams. Once methane is converted to higher carbon number alkanes or alkenes, such as ethane or ethylene, there are existing commercial technologies to further react the products of the present invention into liquid hydrocarbons, plastics and other valuable commodities. More particularly, the invention relates to a novel catalyst that converts methane to higher carbon number compounds without the need to use halogens to maintain catalyst activity, and uses steam injection as a co-reactant and also as a heat sink for a mostly exothermic reaction. The invention includes methods for the manufacture of the catalyst and describes process conditions for its use in converting alkanes into organic compounds with carbon numbers of 2 or more, carbon oxides, water and hydrogen, in a process referred to herein as the oxidative reforming of hydrocarbons.

BACKGROUND OF THE INVENTION

Natural gas is predicted to outlast oil reserves by a significant margin and large quantities of methane, the main component of natural gas, are available in many areas of the world. Natural gas often contains about 80-100 mole percent methane, the balance being primarily heavier alkanes such as ethane. Alkanes of increasing carbon number are normally present in decreasing amounts in crude natural gas streams. Carbon dioxide, nitrogen, and other gases may also be present. Most natural gas is situated in areas that are geographically remote from population and industrial centers making it difficult to utilize these gas resources. The costs and hazards associated with the compression, transportation, and storage of natural gas make its' use economically unattractive. Also, in some regions where natural gas is found combined with liquid hydrocarbons, the natural gas is often flared to recover the liquids. This wasted resource also contributes to global carbon dioxide emissions and to undesirable global warming.

To improve the economics of natural gas use, much research has focused on methane as a starting material for the production of higher hydrocarbons and hydrocarbon liquids. The conversion of methane to hydrocarbons is typically carried out in two steps. In the first step, methane is reformed with water (also called steam reforming) to produce carbon monoxide and hydrogen (i.e., synthesis gas or "syngas"). The reaction is shown in equation 1:

$$CH_4 + H_2O => CO + 3H_2 (\Delta H°_{298} = 206.1 \text{ kJ/mol}),\quad \text{Equation 1}$$

methane-steam reforming.

In a second step, the syngas is converted to hydrocarbons. For example, Sasol Ltd. of South Africa utilizes the Fischer-Tropsch process to provide fuels that boil in the middle distillate range. Middle distillates are defined as organic compounds that are produced between kerosene and lubricating oil fractions in the refining processes. These include light fuel oils and diesel fuel as well as hydrocarbon waxes.

Current industrial use of methane as a chemical feedstock is also a two stage process. In the first process methane is converted to carbon monoxide and hydrogen (syngas) by either steam reforming (see Equation 1) or by dry reforming. In the dry reforming process, carbon dioxide and methane are subjected to high temperature (generally between about 700 degrees C. to about 800 degrees C.) in the presence of a catalyst. This in turn forms hydrogen and carbon monoxide (see Equation 5). Steam reforming currently is the major process used commercially for the conversion of methane to synthesis gas.

During syngas synthesis, other reactions, such as a water gas shift reaction, occur simultaneously with reactions shown in Equation 1. One such water gas reaction is shown in Equation 2 and is frequently in a dynamic equilibrium state.

$$CO + H_2O \Leftrightarrow CO_2 + H_2 \quad \text{Equation 2}$$

Although steam reforming has been practiced for over five decades, efforts to improve the energy efficiency and reduce the capital investment required for this technology continue. Syngas, once produced, can then be converted to other compounds useful in the chemical industries. The two step process, syngas formation followed by reforming reactions, such as methanol synthesis, requires two reactor stages and is inherently inefficient due to heat and material losses as well as the need for additional capital equipment for processing and separating the resulting gas and liquid streams. Such a process is disclosed in U.S. Pat. No. 6,797,851 to Martens et al., where two reactors are utilized to produce olefins with each reactor having a different catalyst.

A third stage has been practiced, also by converting the methanol produced into hydrocarbons composed of alkenes, alkanes, naphthas and aromatic compounds. The product distribution that is produced depends on the catalyst and the process conditions used for conversion of the methanol. Other more complex processes to convert natural gas to liquids have been described involving synthesis, transportation of the end product to another site followed by further processing (see U.S. Pat. No. 6,632,971 to Brown et al. which describes a process for converting natural gas to higher value products using a methanol refinery remote from the natural gas source).

The catalytic partial oxidation of hydrocarbons, e.g., natural gas or methane to syngas is known in the art. While currently limited as an industrial process, partial oxidation has recently attracted much attention due to its' significant inherent advantages, such as the significant heat that is released during the process, in contrast to steam reforming processes that consume large amounts of energy.

In catalytic partial oxidation, natural gas is mixed with air, oxygen-enriched air, or oxygen, and introduced to a catalyst at elevated temperatures and pressures. The partial oxidation of methane yields a syngas mixture with a $H_2:CO$ ratio of 2:1, as shown in Equation 3.

$$CH_4 + \tfrac{1}{2}O_2 => CO + 2H_2 \quad \text{Equation 3}$$

The partial oxidation reaction is exothermic, while the steam reforming reaction is strongly endothermic. The highly exothermic reactions of partial oxidation have made it inherently difficult to control the reaction temperature in the catalyst bed. This is particularly true when scaling up the reaction from a micro reactor (i.e., ¼ in (about 6 mm) diameter reactor tube and less than 1 gram of catalyst) to a larger scale commercial reactor unit because of the additional heat generated in large reactors and the limited heat transfer available in a larger reactor. If heat is not removed or controlled in such a way that temperature control can be maintained, partial oxidation can transition to full oxidation, with the major quantities of end products being relatively low value carbon dioxide and water. Furthermore, the oxidation reactions are typically much faster than the reforming reactions. The selectivity of catalytic partial oxidation to various end products are controlled by several factors, but one of the most important of these factors is the choice of catalyst composition. There is much prior art focusing on the partial oxidation of methane to syngas that then requires conversion to more valuable higher carbon number organic compounds in a second reaction stage. Many of the catalysts used in the prior art for the partial oxidation of methane have included precious metals and/or rare earth compounds. The large volumes of expensive catalysts needed by prior art for catalytic partial oxidation processes and the need for a separate reforming operation have placed these processes generally outside the limits of economic justification.

For successful operation at commercial scale, the catalytic partial oxidation process must be able to achieve a high conversion of the methane feedstock at high gas hourly space velocities ("GHSV"), and selectivity of the process to the desired products. Such high conversion and selectivity must be achieved without detrimental effects to the catalyst, such as the formation of carbon deposits ("coke") on the catalyst, which severely reduces catalyst performance. An approach to prevent partial oxidation reactions of methane from creating primarily carbon dioxide and water is to limit the availability of oxygen in the reaction zone. This often, however, results in coke formation on the catalyst. Accordingly, substantial effort has been devoted in the art to develop catalysts allowing commercial performance without coke formation.

A number of processes have been described in the art for the production of either syngas and/or organic compounds with carbon numbers of 2 or more (also denoted as $C_2+$ compounds) from methane via catalyzed partial oxidation reactions or the so called shift gas process followed by recombination of the syngas to produce organic compounds with carbon numbers of 2 or more.

As used herein, the term "$C_2+$ compounds" refers to compounds such as, but not limited to, ethylene, ethane, propylene, butane, butene, heptane, hexane, heptene, octene and all other linear and cyclical hydrocarbons where two or more carbons are present. For the purpose of chemical analysis in the examples contained herein, organic compounds that remain in gaseous state were analyzed by means of gas chromatography and higher carbon number materials were collected as condensate liquids. Generally, gaseous materials have carbon numbers less than about 8.

The noble metals have been used as catalysts for the partial oxidation of methane, but they are scarce and expensive. Less expensive catalysts such as nickel-based catalysts have the disadvantage of promoting coke formation on the catalyst during the reaction, which results in loss of catalytic activity. Metal carbides and nitrides have also been shown to exhibit catalytic properties similar to the precious metals. A. P. E. York et al., (Stud. Surf. Sci. Catal. (1997), 110 (3rd World Congress on Oxidation Catalysis, 1997), 711-720.) and Claridge et al. (J. Catalysis 180:85-100 (1998)) disclose the use of molybdenum and tungsten carbides as catalysts for the partial oxidation of methane to syngas but suffered from rapid catalyst deactivation.

U.S. Pat. No. 4,522,708 (Leclercq et al.) describes a process for reforming petroleum products by the catalysis of dehydrocyclization, isomerization, hydrogenolysis and dehydrogenation reactions, the improvement wherein the catalysts employed comprise a metal carbide.

U.S. Pat. No. 5,336,825 (Choudhary et al.) describes an integrated two step process for conversion of methane to liquid hydrocarbons of gasoline range.

U.S. Pat. No. 6,090,992 (Wu et al.) describes a carburized transition metal-alumina compound employed as a catalyst in the isomerization of a hydrocarbon feedstock comprising saturated hydrocarbons.

U.S. Pat. No. 6,207,609 (Gao et al.) describes a metastable molybdenum carbide catalyst for use as a catalyst for methane dry reforming reaction.

U.S. Pat. No. 6,461,539 to Gaffney describes metal carbide catalysts and a process for producing synthesis gas using a mixed metal carbide catalyst.

U.S. Pat. No. 6,488,907 (Barnes et al.) describes a method of converting a reactant gas mixture comprising hydrocarbon compounds with carbon numbers from 1 to 5 and oxygen into a product gas mixture comprising $H_2$ and CO using a catalyst comprising a catalytically active component selected from the group consisting of rhodium, platinum, ruthenium, iridium, rhenium, and combinations thereof, supported on a catalyst support chosen from the group consisting of oxide-dispersion-strengthened alloys comprising aluminum, chromium, and yttrium oxide, at least one metal selected from the group consisting of iron, nickel, and cobalt, and, optionally, titanium, and non-oxide-dispersion-strengthened alloys comprising chromium, aluminum, titanium, an element selected from the group consisting of yttrium, lanthanum and scandium, and at least one metal selected from the group consisting of iron, nickel and cobalt, the catalyst having a metal oxide layer disposed between said catalytically active component and the support.

U.S. Pat. No. 6,518,476 (Culp et al.) describes methods for manufacturing olefins such as ethylene and propylene from lower alkanes, that is, methane, ethane and/or propane, by oxidative dehydrogenation at elevated pressure.

U.S. Pat. No. 6,555,721 (Griffiths et al.) describes a process for producing a mono-olefin from a feedstock containing a paraffinic hydrocarbon comprising feeding a gaseous paraffinic hydrocarbon-containing feedstock and a molecular oxygen-containing gas to an autothermal cracker wherein they are reacted in the presence of a catalyst.

U.S. Pat. No. 6,596,912 (Lunsford et al.) discloses processes and systems for the conversion of methane in high yields to $C_4+$ hydrocarbons. The principal steps of the recycle process include reacting methane and $O_2$ in an oxidative coupling reactor over a $Mn/Na_2$ $WO_4/SiO_2$ catalyst at 800 degrees C. to convert the methane to ethylene, and oligomerizing the ethylene product by reacting it with an H-ZSM-5 zeolite catalyst at 275 degrees C. in a catalytic reactor for subsequent conversion of the ethylene to higher hydrocarbons.

U.S. Pat. No. 6,602,920 (Hall et al.) discloses a process for converting natural gas to a liquid by converting a fraction of the gas stream to reactive hydrocarbons, primarily ethylene or acetylene, and reacting methane and the reactive hydrocarbons in the presence of an acidic catalyst to produce a liquid, predominantly naphtha or gasoline.

U.S. Pat. No. 6,623,720 (Thompson et al.) discloses transition metal carbides, nitrides and borides, and their oxygen containing analogs useful as water gas shift catalysts.

U.S. Pat. No. 6,852,303 (Seegopaul et al.) discloses a molybdenum carbide compound for use as a catalyst for the methane dry reforming reaction and the water gas shift reaction.

U.S. Pat. No. 6,887,455 (Carpenter et al.) describes a reactor that utilizes a catalyst comprising rhodium dispersed on a refractory oxide support material which comprises as cations cerium and zirconium, wherein the weight ratio of cerium to zirconium in the support material is from 50:50 to 99.5:0.5. The catalyst is used in the self-sustaining combination of exothermic partial oxidation and endothermic steam-reforming to produce a gas-stream containing mainly hydrogen, carbon dioxide and nitrogen.

U.S. Pat. No. 6,930,068 (Kaneko et al.) describes a methanol reforming catalyst for generating hydrogen by reforming methanol in the atmosphere containing oxygen and steam contains a metal oxide support and Pd—Zr alloy. The reforming catalyst accelerate a steam reforming reaction of the methanol as an endothermic reaction and a partial oxidation reaction of the methanol as an exothermic reaction while suppressing generation of CO gas.

U.S. Pat. No. 7,186,670 B2 (Mamedov et al.) discloses the use of oxidation catalysts used either by themselves or in series with other oxidation catalysts to form benzene, ethylene and syngas.

United States Patent Application Pub. No. 2006/0155157 A1 (Zarrinpashne et al.) describes a catalyst for direct conversion of methane to ethane and ethylene. The example given utilizes 0.5 grams of catalyst in a micro-reactor configuration.

In a co-pending patent application (U.S. Ser. No. 11/517,839 to Bagherzadeh et al.) we disclosed a catalyst that demonstrates both exothermic reactions (oxidative coupling) and endothermic reactions (reforming), leading to the production of hydrocarbons having carbon numbers of 2 or greater from a feedstock such as methane gas. The catalysts used a halogen, such as chlorine, to maintain catalytic activity. Halogens can be corrosive, and can be difficult to handle at elevated temperatures. Carbon dioxide was used in the feed stream, and it is difficult to remove and/or recycle back into the feed stream.

The prior art describes i) the use of a capital intensive multi step Fisher-Tropsch process (syngas formation followed by reforming) to produce higher carbon compounds; ii) limitations in the size of reactors and amount of catalyst used due to the need to rapidly extract heat to avoid the formation of undesirable combustion products (primarily $CO_2$ and $H_2O$). Thermal instability will result if this technology were scaled up to commercial size; iii) processes utilizing corrosive halogens to promote and/or maintain catalyst activity. Other inventions have poor catalyst life and/or low conversions and yields of desired reaction products. Prior inventions have relied mainly on partial oxidation of methane that results in high levels of undesirable carbon oxides and water or dehydrogenation type mechanisms that result in carbon formation and coking of the catalyst.

The prior art does not contemplate the present invention that utilizes a unique combination of catalyst ingredients and preparation process to obtain high conversions of methane and high selectivity to $C_{2+}$ organic compounds without the deficiencies of prior art.

Thus there is a continuing need for better processes and catalysts for the conversion of methane directly to higher carbon number organic compounds that can be directly used in chemical synthesis without going through the costly and inefficient step of first converting methane to syngas. The process and catalyst should exhibit long catalytic activity at high space velocities and be scalable to a size that can be utilized in a commercial process.

BRIEF SUMMARY OF THE INVENTION

Embodiments of the present invention relate to the oxidative reforming of hydrocarbons, which as has been defined herein, refers to the formation of hydrocarbons having carbon numbers of two (2) or greater. The catalyst used in the present invention is a mixed oxide catalyst that demonstrates a high conversion of methane to $C_{2+}$ compounds. The catalyst maintains catalytic activity without the addition of halogens that could prove difficult to handle and corrosive to reactor components in this high temperature reaction environment.

Embodiments of the present invention utilize water vapor as a diluent/coolant and possible co-reactant. The use of water instead of gaseous carbon dioxide (as disclosed in our co-pending U.S. patent application Ser. No. 11/517,839) avoids the more difficult task of separating gaseous $CO_2$ from the reactant stream because water can be more easily condensed and removed/recycled from the reactor outlet stream. Embodiments of the present invention demonstrate long catalyst life, high conversions to $C_{2+}$ compounds and lack of coking of the reactor. Additionally, no leaching of metallic compounds from the catalyst of the present invention was observed when using $H_2O$ in the feed stream. This is in contrast to prior experiments using a catalyst containing tin which, for example, had exhibited leaching of the tin when $H_2O$ was present in the feed stream.

The catalyst used in the present invention is produced using water soluble metal compounds and solid metal oxides. A major component of the present catalyst comprises one or more transition metal compounds (highest $C_{2+}$ yields utilizing a combination of cobalt, manganese and tungsten) along with a smaller quantity of an alkali metal as a promoter (highest $C_{2+}$ yields utilizing sodium).

Embodiments of the present invention provide a process for supplying a feed gas mixture comprised mainly of methane, oxygen and $H_2O$ (in the form of steam) that is fed over a novel catalyst (nitrogen was also present for calibration and to represent possible air or oxygen enriched air feed) under conditions that result in near isothermal conditions. The feed gas is converted to a mixture of alkenes, carbon dioxide, carbon monoxide, hydrogen and other higher carbon number organic compounds that can be used in chemical synthesis reactions or as a liquid fuel.

Embodiments of the present invention include processes for making the new catalysts and using these catalysts to produce products such as, but not limited to, ethylene, ethane, carbon monoxide and hydrogen. Excellent levels of conversion of methane and oxygen reactants and selectivity for producing organic compounds with carbon numbers of 2 or more are achievable by these embodiments. Although not wishing to be bound by a particular theory, the inventors believe that the primary reactions catalyzed by the preferred catalysts described herein is the partial oxidation reactions.

An advantage of the embodiments of the present invention is that no appreciable coking occurs with use of the new catalyst compositions, and eventual catalyst deactivation is delayed or avoided. The catalyst embodiments of the present invention also maintain activity without the need for halogen addition to maintain catalyst activity.

Another embodiment of the present invention recycles the unconverted feed gases back to the reactor inlet.

Yet another embodiment of the present invention provides for multiple reactors in series to increase yield either with or without inter-stage removal of reactants.

The catalysts are synthesized employing one or more metal compounds selected from the transition metal family. The best conversions of methane to $C_{2+}$ compounds were obtained with catalysts using Tungsten (W) and Manganese (Mn) transition and Cobalt (Co) metal oxides. In some embodiments the novel catalyst compound comprises an additional transition metal. The particular transition metal and the quantity used in a catalysts composition will determine the selectivity and conversion of methane to other compounds.

Some embodiments of the catalyst also include promoters in the composition. The promoters may be a metal or metal oxide of the rare earth, alkali, or alkaline earth elements. One or more promoter metals may be used in preparation of the catalyst, and in one embodiment the promoter metal is sodium.

Another aspect of the present invention is a process for forming a product gas mixture comprising hydrocarbons with carbon numbers of 2 or more by a combination of net partial oxidation, water gas shift, cracking and reforming reactions. In some embodiments the process comprises contacting a reactant gas mixture comprising the hydrocarbon and a source of oxygen with a catalytically effective amount of catalyst. The process includes maintaining the catalyst and the reactant gas mixture at conversion-promoting conditions of temperature, reactant gas composition and flow rate during this contacting. In some embodiments the catalyst employed is a supported catalyst. In some embodiments, the catalyst includes a promoter metal.

It has unexpectedly been discovered that a titanium reactor tube can be utilized with embodiments of the present invention. It has been discovered that a titanium tube that is preheated in the presence of oxygen to about 900 degrees C. will form a protective oxide skin; and the heated tube may then be used in the reactor and will not interfere with the desired reactions. The use of a titanium reactor also facilitates operation at elevated pressures. Varying the pressure of the reaction zone of the present invention allows for adjustment of the type of alkenes and $C_{2+}$ components produced.

Some embodiments of the processes for converting methane to organic compounds with carbon number of 2 or more comprise mixing a natural gas feedstock and an oxygen-containing gas feedstock combined with steam to provide a reactant gas mixture feedstock having a composition of methane, ethane, carbon monoxide, hydrogen, carbon dioxide, steam and oxygen.

In some embodiments, the oxygen-containing gas further comprises steam, $CO_2$, or a combination thereof, and the process includes mixing a hydrocarbon feedstock and a gas comprising steam and/or $CO_2$ to provide the reactant gas mixture.

Another embodiment of the present invention utilizes reactors in series, either with or without inter-stage separation and recycling of the un-reacted and combustion by-products of the process to increase the overall yield of methane to organic compounds with carbon numbers of 2 or greater.

A catalyst composition and process facilitates the oxidative reforming of low molecular weight hydrocarbons, such as methane, to other hydrocarbons having 2 or more carbon atoms ("$C_{2+}$ compounds"). Compositions having a formula comprising a metal, tungsten, manganese and oxygen effectively catalyze the oxidative reforming of methane with a high rate of conversion and selectivity. The catalyst embodiments of the present invention do not require the addition of a halogen to the reactor to maintain catalytic activity. Controlling feed gas flow and catalyst bed temperature controls the exothermic OCM reaction, avoiding runaway reactions or coking. A single or multiple reactor system can be utilized for the oxidative reforming reactions. Using two reactors in series, catalyst embodiments produced favorable yields of $C_{2+}$ compounds, in the presence or absence of a distributed oxygen feed, and with or without interstage effluent cooling. Removal of desirable end products from the reactor effluent, followed by recycling of the residual effluent, increases the conversion to, and ultimate yield of desirable end products.

One embodiment of the present invention is a composition for the oxidative reforming of hydrocarbons, the composition comprising:

a catalyst having the formula $M_1$, W, Mn $O_x$, wherein $M_1$ is a metal selected from the group consisting of Group IA and Group VIII of the Periodic Table of the Elements, and $M_1$ comprises from about 0.01 mol to less than about 2 mol;

W is tungsten, and W comprises from about 0.01 mol to less than about 2 mol;

Mn is manganese, and Mn comprises from about 0.3 mol to less than 3 mol;

O is oxygen; and

X is a quantity from about 0.1 to about 4.

Certain embodiments of this catalyst can be represented by the formula Na W MnO, while others can be represented by the formula Co W MnO.

In another embodiment of the present invention, a composition for the oxidative reforming of hydrocarbons comprises:

a catalyst represented by the formula $M_1$, $M_2$, W Mn $O_x$, wherein $M_1$ is a metal selected from the group consisting of Group IA and Group VIII of the Periodic Table of the Elements, and $M_1$ comprises from about 0.01 mol to less than about 2 mol;

$M_2$ is a metal selected from the group consisting of Group IVA, Group IVB and Group VIII of the Periodic Table of the Elements, and $M_2$ comprises from about 0.01 mol to less than about 2 mol;

W is tungsten, and W comprises from about 0.01 mol to less than about 2 mol;

Mn is manganese, and Mn comprises from about 0.3 mol to less than 3 mol;

O is oxygen; and

X is a quantity from about 0.1 to about 4.

Certain embodiments of this catalyst can be represented by the formula Na Co W MnO, while other variations include Ti or Si instead of Co, or may include Cs instead of Na. In this embodiment, the two metals, other $M_1$ and $M_2$ are different from each other. Other embodiments of this catalyst can comprise an additional metal, such as La, Ba or Mo.

The various catalyst embodiments were found to catalyze the oxidative reforming of methane to various hydrocarbons having 2 or more carbon atoms ($C_{2+}$ compounds), generally with yield of $C_{2+}$ compounds in excess of 20%, and sometimes above 25%.

In another embodiment, a catalyst composition is mixed with a salt of an element from Group IVA of the Periodic Table of the Elements, and the resulting admixture able to catalyze the oxidative reforming of methane to various hydrocarbons having 2 or more carbon atoms ($C_{2+}$ compounds) with yield of $C_{2+}$ compounds in excess of 20%.

The catalyst embodiments can be used in a method for the oxidative reforming of hydrocarbons, in which the method comprises the steps of preparing one of the catalyst compositions described above, sizing the composition to a size suitable for use in an oxidative reforming reactor; adding a quantity of the sized composition to the oxidative reforming reactor; contacting a feed gas stream comprising at least a hydrocarbon and oxygen in the oxidative reforming reactor under oxidative reforming conditions in the presence of the catalyst composition; and collecting the effluent from the oxidative reforming reactor, wherein the effluent comprises hydrocarbons having more than 2 carbons atoms ($C_{2+}$ compounds).

The method can employ one or more oxidative reforming reactors, wherein the method further comprises the steps of removing the effluent from the oxidative reforming reactor, and having the effluent contacting a plurality of additional oxidative reforming reactors, wherein each of the oxidative reforming reactors contain a quantity of the catalyst composition. The reactors are used in a series configuration, and could be used in a parallel configuration. The effluent from a first oxidative reforming reactor can be cooled to a temperature ranging from about 400 degrees C. to less than about 600 degrees C. prior to the step of having the effluent contacting the additional oxidative reforming reactors. Oxygen is one component of the feed gas mixture, and in a multiple reactor system, it can distributed to the oxidative reforming reactors in an approximately equal proportion to the number of oxidative reforming reactors.

BRIEF DESCRIPTION OF THE SEVERAL VIEWS OF THE DRAWING

FIG. 1A is a schematic illustration of a single reactor system used in embodiments of the present invention.

FIG. 1B is a schematic illustration of the dual reactor system.

FIG. 1C illustrates the general configuration of a reactor and the heating furnaces.

FIG. 2 is an X-Ray Diffraction analysis of several catalyst embodiments, prepared with different manganese oxides. The numerals above the peaks correspond to known materials, where:
- numeral 1 represents $MnWO_4$;
- numeral 2 represents $Na_2WO_4$
- numeral 3 represents $Na_2O\ MnO_2$;
- numeral 4 represents $CoMn_2O_4$;
- numeral 5 represents $(CoMn)(CoMn)_2O_4$;
- numeral 6 represents $Mn_2O_3$;
- numeral 7 represents gamma $Mn_2O_3$; and
- numeral 8 represents $MnO_2$.

FIG. 3 is an X-Ray Diffraction analysis of a fresh catalyst composition (bottom) with that same catalyst after being used eight times for OCM. The numerals above the peaks are the same as in FIG. 2.

FIG. 4 is a summary of experiments run in the two-reactor system.

FIG. 6 is a summary of one- and two-reactor experiments, run with and without the addition of oxygen to the second reactor.

DETAILED DESCRIPTION OF THE INVENTION

Figure 5:
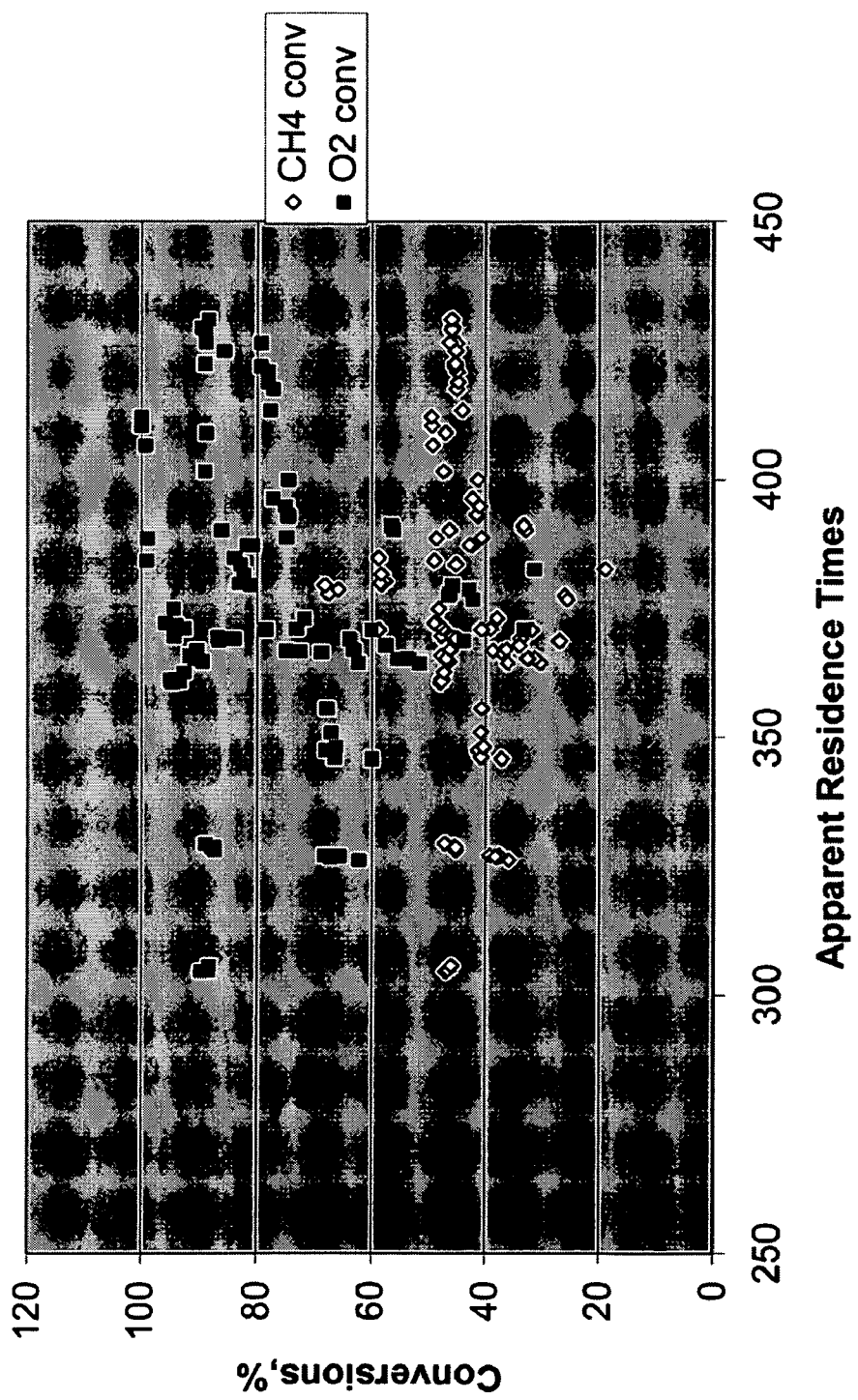
FIG. 5 shows the effects of residence time on the yield of $C_{2+}$ and other end products.

The present invention relates to the oxidative reforming of hydrocarbons, which as has been defined herein, refers to the formation of hydrocarbons having carbon numbers of two (2) or greater. The catalyst used in the present invention is a mixed oxide catalyst that demonstrates a high conversion of methane to $C_{2+}$ compounds. The catalyst maintains catalytic activity without the addition of halogens that could prove difficult to handle and corrosive to reactor components in this high temperature reaction environment.

Embodiments of the present invention utilize water vapor as a diluent/coolant and possible co-reactant. The use of water instead of gaseous carbon dioxide (as disclosed in our co-pending U.S. patent application Ser. No. 11/517,839) avoids the more difficult task of separating gaseous $CO_2$ from the reactant stream because water can be more easily condensed and removed/recycled from the reactor outlet stream. Embodiments of the present invention demonstrate long catalyst life, high conversions to $C_{2+}$ compounds and lack of coking of the reactor. Additionally, no leaching of metallic compounds from the catalyst of the present invention was observed when using $H_2O$ in the feed stream. This is in contrast to prior experiments using a catalyst containing tin which, for example, had exhibited leaching of the tin when $H_2O$ was present in the feed stream.

Some catalyst embodiments used in the present invention are produced using water soluble metal compounds and solid metal oxides. A major component of the present catalyst comprises one or more transition metal compounds (highest $C_{2+}$ conversions utilizing a combination of cobalt, manganese and tungsten) along with an alkali metal as a promoter (highest $C_{2+}$ conversions utilizing sodium).

Embodiments of the present invention provide a process for supplying a feed gas mixture comprised mainly of methane, oxygen and $H_2O$ (in the form of steam) that is fed over a novel catalyst (nitrogen was also present for calibration and to represent possible air or oxygen enriched air feed) under conditions that result in near isothermal conditions. The feed gas is converted to a mixture of alkenes, carbon monoxide, hydrogen and other higher carbon number organic compounds that can be used in chemical synthesis reactions or as a liquid fuel.

Embodiments of the present invention overcome shortcomings of previous processes to convert natural gas into more commercially usable products.

Embodiments of the present invention include processes for making the new catalysts and using these catalysts to produce products such as, but not limited to, ethylene, ethane, carbon monoxide and hydrogen. Excellent levels of conversion of methane and oxygen reactants and selectivity for producing organic compounds with carbon numbers of 2 or more are achievable by these embodiments. Although not wishing to be bound by a particular theory, the inventors believe that the primary and secondary reactions catalyzed by the preferred catalysts described herein are the partial oxidation reactions as well as reforming reactions shown in Equations 1-13.

Other reactions such as reforming with carbon dioxide and water gas shift reactions have also been shown to be present. Carbon dioxide may be regenerating the catalyst with the corresponding production of carbon monoxide and an oxidized catalyst site.

$$CH_4+2O_2 \Rightarrow CO_2+2H_2O \qquad \text{Equation 4}$$

$$CH_4+CO_2 \Rightarrow 2CO+2H_2 \qquad \text{Equation 5}$$

$$2CH_4+O_2 \Rightarrow 2CO+4H_2 \qquad \text{Equation 6}$$

$$CH_4+O_2 \Rightarrow CO+H_2+H_2O \qquad \text{Equation 7}$$

$$2CH_4+O_2 \Rightarrow C_2H_4+2H_2O \qquad \text{Equation 8}$$

$$2CH_4+\tfrac{1}{2}O_2 \Rightarrow C_2H_6+H_2O \qquad \text{Equation 9}$$

$$CO_2+4H_2 \Rightarrow CH_4+2H_2O \qquad \text{Equation 10}$$

(probability of this reaction is extremely low)

$$CO_2+H_2 \Rightarrow CO+H_2O \qquad \text{Equation 11}$$

$$2CO_2+2CH_4 \Rightarrow C_2H_4+2CO+2H_2O \qquad \text{Equation 12}$$

$$3CO_2+4CH_4 \Rightarrow C_4H_4+5H_2O+CO \qquad \text{Equation 13}$$

The reactions in Equation 5 and 11 are both favorable (from a kinetics analysis), and are also endothermic.

The oxidation of methane to carbon dioxide and water (Equation 1) is very favorable and highly exothermic.

The oxidative coupling catalyst may also react by cleaving hydrogen from methane to form free radicals that may then react directly with other active compounds. An alternative route that might be possible is formation of carbene radicals, because of high surface reaction temperatures. These reactions are illustrated as follows:

$$2CH_4 + O_2 \rightarrow 2CH_2: + 2H_2O \quad \text{Equation 14}$$

$$2CH_2: \rightarrow C_2H_4 \quad \text{Equation 15}$$

Embodiments of the present invention utilize a catalyst combination that utilizes oxidative coupling, water gas shift and reforming mechanisms as well as intermediates in the reaction to form $C_{2+}$ compounds. Prior to the present invention, oxidative coupling of methane had limitations for conversion of methane to higher carbon number organic compounds because as reactor size was increased, control of the highly exothermic reaction was difficult resulting in poor temperature control. The processes also utilized halogens to maintain catalyst activity, and needed large amounts of mostly inert feed gas ($CO_2$). Too high a temperature results in conversion to mainly carbon dioxide and water. Too low of a temperature yields low conversion of methane.

The prior art in this area utilizes micro reactors with catalyst content of about 1 gram. The present invention has been utilized on reactors up to 1½ in. (approximately 38 mm) in diameter and with a catalyst charge of up to 175 grams. Embodiments of the present invention utilize a novel catalyst that results in both endothermic and exothermic reactions thus allowing for high conversions of methane to higher carbon materials in larger scale reactors with good temperature control. Other chemical reactions may also occur, but to a lesser extent, catalyzed by the same catalyst composition. Examples of how these higher carbon number compounds might form from the reactant products are shown in Equations 1-15, as well as in Equations 16-18.

$$2CO + 4H_2 => C_2H_4 + 2H_2O \quad \text{Equation 16}$$

$$2CO + 5H_2 => C_2H_6 + 2H_2O \quad \text{Equation 17}$$

$$2CH_4 + \tfrac{1}{2}O_2 => H_2O + C_2H_6 => C_2H_4 + H_2O + H_2 \quad \text{Equation 18}$$

(Partial oxidation of methane followed by dehydrogenation of ethane.)

What reactions in fact do occur will be determined by the thermodynamic and kinetic properties. Only the kinetic properties of the system are determined by the catalyst. The novel catalyst of the present invention may result in many different equilibrium constants present depending on the local thermodynamic condition. The present invention makes use of both catalyzing favorable endothermic reactions, such as $CO_2 + CH_4 => 2\ CO + 2H_2$ (Equation 5) as well as exothermic reactions such as $O_2 + 2CH_4 => 2CO + 4H_2$ (Equation 6) occurring in the catalyst bed to control reaction temperatures and reduce the production of unfavorable combustion products of $CO_2$ and $H_2O$. Once the intermediary reaction products (primarily methyl and carbene radicals) are formed, conditions are favorable for the production of organic compounds with carbon numbers of 2 or more. Selectivity can be controlled by minimizing the total combustion of these intermediate components to maximize selectivity to $C_2+$ organic compounds and minimize generation of heat. Energy generated by combustion of the methane is on the order of 199 kcal/mole of methane consumed whereas the energy generated for production of ethylene is of the order of 33 kcal/mole of methane consumed.

Other feed gases may include other hydrocarbons such as, but not intended to be limited to, ethane, propane, butane, hexane, heptane, normal-octane, iso-octane, naphthas, liquefied petroleum gas, and middle distillate hydrocarbons.

An advantage of the embodiments of the present invention is that no appreciable coking occurs with use of the catalyst compositions, and eventual catalyst deactivation is delayed or avoided. The catalyst of the present invention also maintains activity without the need for halogen addition to maintain catalyst activity. Halogens are very corrosive and difficult to handle, especially at elevated temperatures.

Another embodiment of the present invention recycles the unconverted feed gases back to the reactor inlet.

Yet another embodiment of the present invention provides for multiple reactors in series to increase yield either with or without inter-stage removal of products. These embodiments utilize a system of reactors in a series configuration, and could utilize a system of reactors in a parallel configuration.

Catalyst embodiments of the present invention may be applied to a porous or gas permeable support. The catalyst embodiments and/or the support may be in the structural form of a gauze, monolith or foam, for example. The support may contain a material such as MgO, $Al_2O_3$, $SiO_2$, $TiO_2$, titanosilicate, activated carbon, carbon molecular sieves, crystalline and non-crystalline molecular sieves, $ZrO_2$, mullite (an alumina silicate with the formula $3Al_2O_3 \times 2SiO_2$), cordierite (a ceramic material of the formula $2MgO$-$2Al_2O_3$-$5SiO_2$), ceramics and mixtures thereof. The mixed metal catalyst embodiments may also be mixed with, deposited or impregnated into such materials. Catalyst embodiments of the present invention may also be sized and used in a fluidized bed reactor configuration. Although each component of the catalyst embodiment is an active catalyst by itself, it has unexpectedly been discovered that when the components are combined and subjected to a heat history, the combination of metals in the composition forms a unique crystalline structure that is effective in converting methane to ethylene and organic compounds having carbon numbers of 2 or greater.

The processes for making the novel catalysts employ one or more metal compounds selected from the transition metal family. The best conversions of methane to $C_{2+}$ compounds was obtained using catalyst embodiments comprising Tungsten (W) and Manganese (Mn) transition and Cobalt (Co) metals. In some embodiments the catalyst composition comprises an additional transition metal. The particular transition metal selected and the quantity used in a catalyst composition will determine the selectivity and conversion of methane to other compounds.

Some embodiments for synthesizing the novel catalyst also include promoters in the catalyst composition. The promoters may be a metal or metal oxide of the rare earth, alkali, or alkaline earth elements. One or more promoter metals may be used in preparation of the catalyst. In one embodiment, the promoter metal is sodium.

Not to be limited by theory, it is believed the mixed metal oxide catalyst with promoter in embodiments of the present invention results in both endothermic as well as exothermic reactions to occur. The primary reactions that occur with the present catalyst are exothermic. Endothermic reactions, however, allow for controlling reaction temperatures even in larger scale reactors. Prior art using oxidative coupling catalysts had deficiencies of being restricted to very small reactors (⅛-¼ inch diameter; approximately 3-6 mm) to allow for removal of heat of reaction.

Another aspect of the present invention is a process for forming a product gas mixture comprising hydrocarbons with carbon numbers of 2 or more by a combination of net partial oxidation, water gas shift, cracking and reforming reactions. In some embodiments the process comprises contacting a reactant gas mixture comprising the hydrocarbon and a source of oxygen with a catalytically effective amount of a catalyst embodiment. The process includes maintaining the catalyst and the reactant gas mixture at conversion-promoting conditions of temperature, reactant gas composition and flow rate during this period. In some embodiments the catalyst embodiment is a supported catalyst. Some embodiments of catalyst include a promoter.

While not intending to be limited by the theoretical mechanism of the novel catalyst, components of the present invention can incorporate any of the known metals that promote reduction (reduction reactions involve a process where electrons are "gained" and the oxidation state of some atom decreases reactions). Any number of reducing/reforming/water gas shift metals may be used in the present invention. A number of metals were evaluated as shown in Table 1. Molybdenum (Mo) is one such metal that can act as a reducing catalyst and was shown to be effective in embodiments of the present invention.

The reactor may be any suitable reactor, such as a fixed bed reactor with axial or radial flow and with inter-stage cooling or a fluidized bed reactor equipped with internal and external heat exchangers. FIG. 1A illustrates a single reactor embodiment 10 in which the reactor 12 is a fixed bed reactor. The reactor 12 is packed with a layer of quartz at the bottom, followed by a layer of the catalyst 16, and then another layer of quartz. The catalyst is positioned within the reactor 12 such that it is subject to even heating by a series of heat furnaces 18 that are controlled by a controller 20. The upper layer of quartz helps retain the catalyst in position within the reactor. A suitable catalyst is provided in the reactor to facilitate or catalyze conversion of methane to organic compounds with carbon numbers greater than 2.

A feed gas mixture 30 generally comprising nitrogen, carbon dioxide, methane and oxygen, and/or ethane or other hydrocarbon gas, passes through a mass flow controller 32 and mixer 34 prior to being fed into one end of the reactor 12. Steam 36 when required is added from steam generator 38. The effluent 40 from the reactor contains a plurality of reaction products and residual gasses, and is passed through a condenser 42 into which the liquid end products 44 are collected. A sample of the effluent 40 in distributed to a gas chromatograph 46 for determination of the content of the effluent 40. Other pumps that are part of the system include liquid injection pump 48 and high pressure liquid pump 50.

FIG. 1B illustrates a two reactor system 100 in which the effluent 40 from the first reactor 12 are fed into a second reactor 120 for a second OCM reaction. Two types of two reactor systems were employed, the first, shown in FIG. 1B as 100, employed an upflow pattern, in which the effluent 40 from the first reactor 12 were fed into the bottom of the second reactor 120, and allowed to pass out the top of second reactor 120. The oxygen source 110 is divided, such that a portion 112 of the oxygen enters mass flow controller 32 for mixing with the other feed gasses, and another portion 114 is distributed into the reactors.

The second type of reactor system employed is similar to that shown in FIG. 1B, except that in this system the effluent from the first reactor was fed into the top of the second reactor, and allowed to pass out the bottom of the second reactor. In both cases the flow of the feed gasses was with the flow of the end products through the second reactor.

In certain experiments the reactor's tube 12a comprised 304 stainless steel, and in others the reactor's 12a tube comprised titanium. The thermowell 12b was generally stainless steel.

Once the effluent 40 from the first reactor 12 has exited the reactor, it may be cooled to a temperature ranging from about 400 degrees C. to about 500 degrees C. The effluent 40 is then introduced into the second reactor 120, which has a preheat section to reheat the effluent from the first stage to the desired temperature prior to contacting the catalyst 16 in the second reactor 120.

In the second reactor 120, the catalyst 16 is packed between regions of quartz as in the first reactor 12. The second reactor is heated in the same manner as the first reactor, and the effluent 40 from the second reactor 120 are collected and analyzed as described above, and as described in Example 1.

As shown in FIG. 1B, two reactors can be run in series. In the reactions run in series, it is possible to remove the end-products, such as ethylene, from the effluent, and recirculate the residual effluent through the second reactor, or through a plurality of reactors in series, where upwards of three or more reactors could be employed.

It has also unexpectedly been discovered that a titanium reactor tube can be utilized with embodiments of the present invention. A titanium tube that is preheated in the presence of oxygen to about 900 degrees C. will form a protective oxide skin; the tube may then be used in the reactor and will not interfere with the desired reactions. The use of a titanium reactor also facilitates operation at elevated pressures. Varying the pressure of the reaction zone of the present invention allows for adjustment of the type of alkenes and $C_{2+}$ components produced. By contrast, use of stainless steel and other metals for the reactor increases the production of undesirable carbon dioxide under the reaction conditions of the present invention.

The temperature of the reactor is maintained at a temperature of between about 650 degrees C. and about 950 degrees C. In other embodiments the temperature of the reactor is maintained between about 700 degrees C. and about 950 degrees C. Still in other embodiments the step of converting the methane to higher carbon number organic compounds takes place in a temperature range of about 750 degrees to 850 degrees C.

In some embodiments of the hydrocarbon conversion processes, the step of maintaining the catalyst and the reactant gas mixture at conversion-promoting conditions of temperature and pressure during contacting includes maintaining a pressure of from about 100 kPa to about 2500 kPa. In certain embodiments, the pressure is maintained at about 200 to 1000 kPa.

Some embodiments of the processes for hydrocarbon conversion comprise mixing natural gas as a feedstock, and an oxygen-containing gas feedstock combined with steam to provide a reactant gas mixture feedstock having a composition of ethane, carbon monoxide, hydrogen, carbon dioxide steam and oxygen. Certain of these embodiments provide for a reactant gas mixture feed having a carbon:oxygen atom to mole ratio of about one to about ten, and certain embodiments provide a reactant gas mixture feed having a carbon:oxygen ratio of about 1.5 to about 5.

In some embodiments of the hydrocarbon conversion processes the oxygen-containing gas further comprises steam, $CO_2$, or a combination thereof, and the process includes mixing a hydrocarbon feedstock and a gas comprising steam and/or $CO_2$ to provide the reactant gas mixture.

The feed gas hydrocarbon comprises at least about 50% methane by volume in some process embodiments, and in some embodiments the hydrocarbon contains at least about 80% methane. In certain embodiments the hydrocarbon feedstock and the oxygen-containing feedstock are both preheated before contacting the catalyst.

In certain embodiments the reactant gas mixture is passed over the catalyst at a space velocity of about 500 to about 30,000 normal liters of gas per liter of catalyst per hour (NL/L/h), and in some of these embodiments the space velocity is about 2000 to 10,000 NL/L/h. Some embodiments of the hydrocarbon conversion processes provide for retaining the catalyst in a fixed bed reaction zone. These and other embodiments, features and advantages of the present invention will become apparent with reference to the following description.

It is also contemplated by the present invention to utilize separation and recycling of the un-reacted and combustion by-products of the hydrocarbon conversion process to increase the overall yield of organic compounds with carbon numbers of 2 or greater. Several recent studies have demonstrated that product yields approaching 70 to 80% may be achieved by employing a recycle reactor with continuous removal of ethylene (Y. Jiang et al., Science 264:1563, 1994; R. B. Hall et al., ACS Div. Petr. Chem. Prepr. 39(2):214, 1994; E. M. Cordi et al., Appl. Catal. A: Gen. 155:L1-L7, 1997; A. Mashocki, Appl. Catal. A: General 146:391, 1996). The ethylene may either be directly separated from the recycle stream or it may be converted to another product, which is subsequently separated.

Another embodiment of the present invention utilizes reactors in series, either with or without inter-stage separation and recycling of the un-reacted and combustion by-products of the process to increase the overall yield of methane to organic compounds with carbon numbers of 2 or greater.

Catalyst Preparation

In a broad aspect of the invention, the method of producing the catalysts comprises forming an aqueous slurry of the selected salts.

A polymeric binder is added to the slurry to form a paste. The paste is then dried, and crushed. In order to convert the metals and metal salts into the desired form the resulting powder is heated using a temperature profile commensurate with the polymeric binder, and then held at a calcination temperature for calcining the crushed paste to form the catalyst. This procedure is similar to that described in our U.S. Pat. No. 7,291,321, incorporated by reference herein. After calcination, the powder is sieved to a size appropriate for the catalytic reactor, generally on the range of from about 1-about 4 mm, in some embodiments, from about 1-about 2 mm and in other embodiments from about 2-about 4 mm.

The metal salts used for the preparation of the catalyst could be chosen from among a variety of compounds. Sources of manganese that could be employed are manganese (II) acetate, manganese, carbonates, manganese, chloride, manganese (II) chloride hydrate, manganese (II) chloride tetrahydrate, manganese (II) form are hydrate, manganese (II) molybdate, manganese nitrate, manganese oxides such as MnO, $MnO_2$, $Mn_2O_3$, gamma-$Mn_2O_3$ and $Mn_3O_4$. Manganese nitrate and the manganese oxides $MnO_2$, $Mn_2O_3$, and gamma-$Mn_2O_3$ were used to prepare several catalyst preparations.

Sources of barium could include barium acetate, barium aluminate, barium calcium tungsten oxide, barium carbonate, barium chloride, barium chlorate monohydrate, barium chloride dehydrate, barium ferrite, barium hydroxide, barium hydroxide monohydrate, barium hydroxide octahydrate, barium, hydroxide hydrate, barium isopropoxide, barium manganate, barium metasilicate, barium molybdate, barium nitrate, barium nitrite hydrate, barium oxalate, barium oxide, barium sulfate, barium, sulfide, barium titanate and barium tungstate. Barium carbonate was the barium source for several catalyst preparations.

Sources of calcium could include calcium salts such as calcium carbonate, calcium chloride, calcium chloride dihydrate, calcium chloride hexahydrate, calcium chloride hydrate, calcium hydride, calcium hydroxide, calcium molybdate, calcium nitrate tetrahydrate, calcium nitrate hydrate, calcium nitride, calcium oxide, calcium propionate, calcium silicate, calcium sulfate, calcium titanate and calcium tungstate. Calcium oxide was the calcium source for preparing several catalyst preparations.

Sources of cesium could include cesium acetate, cesium carbonate, cesium chloride, cesium formate, cesium hydrogen carbonate, cesium hydroxide monohydrate, cesium nitrate, cesium oxalate, cesium propionate, cesium sulfate and cesium titanate. Cesium acetate was the cesium source for several catalyst preparations.

Sources of cobalt could include cobalt salts such as cobalt acetate, cobalt (II) carbonate hydrate, cobalt (II) chloride, cobalt (II) chloride hydrate, cobalt (II) chloride hexahydrate, cobalt (II) hydroxide, cobalt (II) nitrate hexahydrate, cobalt (II, III) oxide, cobalt (II) oxide, cobalt (II) sulfate heptahydrate and cobalt (II) sulfate hydrate. Cobalt (II) nitrate, as $Co(NO_3)_2.6H_2O$ was the cobalt source for several catalyst preparations.

Sources of iron could include ferric citrate, ferric hydroxide oxide, ferroceneacetic acid, ferrocenedicarboxylic acid, iron (II) acetate, iron (II) chloride, iron (II) chloride tetrahydrate, iron (II) chloride, iron (III) chloride hexahydrate, iron (II) molybdate, iron (III) nitrate nonahydrate, iron (II) oxalate dehydrate, iron (III) oxalate hexahydrate, iron (II) oxide, iron (II, III) oxide, iron (III) oxide, iron (II) sulfate heptahydrate, iron (II) sulfate hydrate, iron (II) sulfide, iron (II) titanate and iron (III) titanate. Iron (III) nitrate nonahydrate was the iron source for several catalyst preparations.

Sources of lanthanum could include lanthanum (III) acetate hydrate, lanthanum (III) carbonate hydrate, lanthanum (III) chloride, lanthanum (III) chloride heptahydrate, lanthanum (III) chloride hydrate, lanthanum (III) hydroxide, lanthanum (III) nitrate hexahydrate, lanthanum (III) hydrate nitrate, lanthanum (III) oxide, lanthanum (III) oxalate hydrate, lanthanum (III) sulfate, lanthanum (III) sulfate nonahydrate and lanthanum (III) sulfate hydrate. Lanthanum nitrate hexahydrate was the lanthanum source for several catalyst preparations.

Sources of sodium could include sodium acetate, sodium benzoate, sodium bicarbonate, sodium carbonate, sodium chlorate, sodium chloride, sodium citrate, sodium formate, sodium hydroxide, sodium molybdate, sodium molybdate dehydrate, sodium nitrate, sodium nitrite, sodium oxalate, sodium oxide, sodium propionate, sodium sulfate and sodium tungstate dehydrate. Sodium hydroxide was the sodium source for several catalyst preparations.

Sources of tungsten could include tungsten (IV) carbide, tungsten (IV) chloride, tungsten (VI) chloride, tungsten (VI) dichloride dioxide, tungsten (IV) oxide, tungsten (VI) oxide, tungsten silicide and tungsten (IV) sulfate, as well as other tungstate salts. Ammonium tungstate oxide hydrate, as $NH_4W_{12}O_{41}.5H_2O$ was the tungsten source for several catalyst preparations.

Among the binders that could be used are vinyl acetate dibutyl acrylate, Tylose (methyl 2-hydroxyethyl cellulose), or adhesives, such as Glue-All (a synthetic adhesive manufactured by Elmers, Columbus, Ohio). In the examples that follow, Tylose and Elmer's Glue-All were utilized as binders.

Silicon nitride was used with some catalyst embodiments, where it may function as a binder.

One embodiment of the present invention is a composition for the oxidative reforming of hydrocarbons, the composition comprising:

a catalyst having the formula $M_1$, W, Mn $O_x$, wherein $M_1$ is a metal selected from the group consisting of Group IA and Group VIII of the Periodic Table of the Elements, and $M_1$ comprises from about 0.01 mol to less than about 2 mol;

W is tungsten, and W comprises from about 0.01 mol to less than about 2 mol;

Mn is manganese, and Mn comprises from about 0.3 mot to less than 3 mol;

O is oxygen; and

X is a quantity from about 0.1 to about 4.

Certain embodiments of this catalyst can be represented by the formula Na W MnO, while others can be represented by the formula Co W MnO.

In another embodiment of the present invention, a composition for the oxidative reforming of hydrocarbons comprises:

a catalyst represented by the formula $M_1$, $M_2$, W Mn $O_x$, wherein $M_1$ is a metal selected from the group consisting of Group IA and Group VIII of the Periodic Table of the Elements, and $M_1$ comprises from about 0.01 mol to less than about 2 mol;

$M_2$ is a metal selected from the group consisting of Group IVA, Group IVB and Group VIII of the Periodic Table of the Elements, and $M_2$ comprises from about 0.01 mol to less than about 2 mol;

W is tungsten, and W comprises from about 0.01 mol to less than about 2 mol;

Mn is manganese, and Mn comprises from about 0.3 mol to less than 3 mol;

O is oxygen; and

X is a quantity from about 0.1 to about 4.

Certain embodiments of this catalyst can be represented by the formula Na Co W MnO, while other variations include Ti or Si instead of Co, or may include Cs instead of Na. In this embodiment, the two metals, either $M_1$ and $M_2$ are different from each other. Other embodiments of this catalyst can comprise an additional metal, such as La, Ba or Mo.

In the catalyst embodiments, a Group IA metal such as sodium comprises from about 0.02 mol to about 1 mol; in some embodiments sodium comprises from about 0.02 mol to about 0.5 mol, and in other embodiments sodium comprises from about 0.02 mol to about 0.2 mol. In some catalyst embodiments, a Group IA metal such as cesium comprises less than 0.01 mol.

In some of the catalyst embodiments, tungsten comprises from about 0.01 mol to about 1 mol, and in other embodiments, tungsten comprises from about 0.01 mol to about 0.5 mol.

In the catalyst embodiments, manganese comprises from about 0.3 mol to about less than 3 mol; in some embodiments manganese comprises from about 0.3 mol to about 2.2 mol, and in other embodiments manganese comprises from about 0.3 mol to about 1.5 mol, and in other embodiments, manganese comprises from about 0.3 mol to about 0.5 mol.

In some catalyst embodiments, a Group VIII metal such as cobalt comprises from about 0.03 mol to about 1 mol; in some embodiments cobalt comprises from about 0.03 mol to about 0.5 mol.

Silicon, a Group IVA metal, comprises from about 0.07 mol to about 2 mol in some catalyst embodiments, and may have originated as a salt such as silicon dioxide or silicon nitride.

In some catalyst embodiments, other metals, such as barium or molybdenum, comprise from about 0.07 mol to about 0.3 mol. Lanthanum, titanium and cesium are present in other catalyst embodiments.

As will be described in further detail below, oxygen is present in many catalyst embodiments, and can be in one of several forms, based on the results of X-Ray Diffraction analysis of various catalyst embodiments.

The various catalyst embodiments were found to catalyze the oxidative reforming of methane to various hydrocarbons having 2 or more carbon atoms ($C_{2+}$ compounds), generally with yield of $C_{2+}$ compounds in excess of 20%, and sometimes above 25%.

In another embodiment, a catalyst composition is mixed with a salt of an element from Group IVA of the Periodic Table of the Elements, and the resulting admixture able to catalyze the oxidative reforming of methane to various hydrocarbons having 2 or more carbon atoms ($C_{2+}$ compounds) with yield of $C_{2+}$ compounds in excess of 20%.

The catalyst embodiments can be used in a method for the oxidative reforming of hydrocarbons, in which the method comprises the steps of preparing one of the catalyst compositions described above, sizing the composition to a size suitable for use in an oxidative reforming reactor; adding a quantity of the sized composition to the oxidative reforming reactor; contacting a feed gas stream comprising at least a hydrocarbon and oxygen in the oxidative reforming reactor under oxidative reforming conditions in the presence of the catalyst composition; and collecting the effluent from the oxidative reforming reactor, wherein the effluent comprises hydrocarbons having more than 2 carbons atoms ($C_{2+}$ compounds).

The method can employ one or more oxidative reforming reactors, wherein the method further comprises the steps of removing the effluent from the oxidative reforming reactor, and having the effluent contacting a plurality of additional oxidative reforming reactors, wherein each of the oxidative reforming reactors contain a quantity of the catalyst composition. The reactors are used in a series configuration, and could be used in a parallel configuration. The effluent from a first oxidative reforming reactor can be cooled to a temperature ranging from about 400 degrees C. to less than about 600 degrees C. prior to the step of having the effluent contacting the additional oxidative reforming reactors. Oxygen is one component of the feed gas mixture, and in a multiple reactor system, it can be distributed to the oxidative reforming reactors in an approximately equal proportion to the number of oxidative reforming reactors.

Table 1 lists a number of catalysts prepared with various transition metal ingredients and alkaline earth metals used as promoters. All the catalyst compositions were evaluated and showed varying degrees of activities related to the conversion of methane. The starting raw materials for the catalysts were either metal oxides or metal salts. The amounts of each catalyst raw material were controlled to yield the noted amount of metal (molar ratio) in the final catalyst composition, expressed as a molar ratio, of the various components to each other. As indicated in Table 1, this is expressed as the molar ratio of each component to Manganese (Mn); the molar ratio of Mn/Mn is indicated as 1.0.

A detailed description of one catalyst composition and the method of preparation is given in Example 1. The actual metal state in the final catalyst is a complex of metal oxides and metal alloys, which are detected by X-ray Diffraction ("XRD").

X-Ray Diffraction analysis of the catalyst samples used an XDS 2000 Scintag Inc. analyzer with a Cu—K alpha (1.5406 angstrom) X-ray tube, and Thermo ARL Pertier detector. Data was analyzed using the software program DMSNT v1.39-Ibeta, and compared to those contained in a database of known X-ray diffraction patterns.

EXAMPLES

Example 1

Catalyst Preparation

A catalyst comprising cobalt, sodium and tungsten was prepared as follows. Into a 500 ml beaker 9 grams ammonium tungstate (99.9% purity from Sigma-Aldrich Co, St. Louis, Mo.) and 1 gram sodium hydroxide (pellets, purity 99.998%, from Sigma-Aldrich Co, St. Louis, Mo.) were dissolved in 200 ml deionized water at a temperature ranging from about 70 degrees C. to about 80 degrees C. In a separate beaker cobalt (II) nitrate hexahydrate (from Sigma-Aldrich Co 99% purity) was dissolved in water at about 70 degrees C. The two dissolved salt solutions were then combined, and 30 grams of manganese (IV) oxide (reagent plus purity, 99% from Aldrich) was added with 10 ml ammonium hydroxide (A.C.S. reagent grade from Sigma-Aldrich Co) to achieve an alkaline pH. The mixture was then transferred to a Pyrex plate and heated for 2-3 hours at about 250 degrees F. (121 degrees C.)

The resulting catalyst paste is placed in a calcination furnace that is continually purged with atmospheric air during initial calcination. The catalyst is heated to 300 degrees C. for thirty minutes and the temperature then increased to 550 degrees C. and held at that temperature for 2 hours. The furnace temperature is then increased to 860 degrees C. and held at that temperature for 24 hours. The furnace is then cooled to room temperature, and the calcined preparation is removed from the furnace. The calcined catalyst is crushed in a mortar and pestle, and sized to fit through a screen #40 sieve (approx 425 microns and 0.0165 inches). The sieved catalyst is pelletized in an Arbor press into tablets approximately ½ in (approximately 12.7 mm) diameter. The tablets are then calcined under inert conditions at 1000 degrees C. for 8 hrs. The pellets are then crushed and sized for use in the reactor.

An XRD analysis of the catalyst prepared in this Example revealed the presence of the following metal oxides: $Mn_2O_3$, $Na_2WO_4$, $MnWO_4$ and $CoMn_2O_4$.

It is theorized that these metal oxides originate during the calcinations process, and could be characterized as follows:

$$Mn_2O_3 = MnO + MnO_2 \quad \text{A}$$

$$Na_2WO_4 = Na_2O + WO_3 \quad \text{B}$$

$$MnWO_4 = MnO + WO_3 \quad \text{C}$$

$$CoMn_2O_4 = CoO + MnO_2 \quad \text{D}$$

Other metal phases have also been identified in the catalysts, based on the XRD data, such as $MnWO_4$ and possibly $Na_2WO_4$ The preparation process described above is also applicable to the other catalysts listed in Tables 1 and 2. Other raw materials that were used to produce a catalyst composition of similar end composition included ammonium heptamolybdate [$(NH_4)_6Mo_7O_{24} \cdot 4H_2O$], also referred to as ammonium molybdate tetrahydrate. Based upon the desired metal ratios in the end product, one can determine the quantities of starting materials needed to prepare a particular catalyst composition.

TABLE 1

Catalyst Listing

| Catalyst | Formulation | Na (mol) | W (mol) | Mn (mol) | Ti (mol) | Si (mol) | Co (mol) | Fe (mol) | Mo (mol) | Ba (mol) |
|---|---|---|---|---|---|---|---|---|---|---|
| 1. MR 34 | Na, W/Mn$_2$O$_3$ | 0.02 | 0.03 | 0.3 | — | — | — | — | — | — |
| 2. MR 34-2 | Na, W/Mn$_2$O$_3$ | 0.07 | 0.1 | 1.1 | — | — | — | — | — | — |
| 3. MR 34-3 | Na, W/Mn$_2$O$_3$ | 1 | 1 | 1 | — | — | — | — | — | — |
| 4. MR 34-4 | Na, W/Mn$_2$O$_3$ | 0.3 | 0.1 | 1.1 | — | — | — | — | — | — |
| 5. MR 34-5 | Na, W/Mn$_2$O$_3$ | 0.07 | 0.1 | 1.7 | — | — | — | — | — | — |
| 6. MR 34-6 | W/Mn$_2$O$_3$ | — | 0.1 | 1.1 | — | — | — | — | — | — |
| 7. MR 34-7 | Na, W/Mn$_2$O$_3$ | 0.07 | 0.01 | 1.1 | — | — | — | — | — | — |
| 8. MR 34-8 | Ti, Na, W/Mn$_2$O$_3$ | 0.07 | 0.1 | 1.1 | 0.02 | — | — | — | — | — |
| 9. MR 34-9 | Na/Mn$_2$O$_3$ | 0.07 | — | 1.1 | — | — | — | — | — | — |
| 10. MR 34-10 | Na, W/Mn$_2$O$_3$ | 0.07 | 0.06 | 1.1 | — | — | — | — | — | — |
| 11. MR 34-11 | Si, Na, W/Mn$_2$O$_3$ | 0.07 | 0.1 | 1.1 | — | 0.07 | — | — | — | — |
| 12. MR 34-12 | Co, Na, W/Mn$_2$O$_3$ | 0.07 | 0.1 | 1.1 | — | — | 0.07 | — | — | — |
| 13. MR 34-13 | Na, W/Mn$_2$O$_3$ | 0.07 | 0.12 | 1.1 | — | — | — | — | — | — |
| 14. MR 34-14 | Ba, Mo, Na, W/Mn$_2$O | 0.07 | 0.1 | 1.1 | — | — | — | — | 0.07 | 0.07 |
| 15. MR 34-15 | Co, Na, W/Mn$_2$O$_3$ | 0.07 | 0.12 | 1.1 | — | — | 0.12 | — | — | — |
| 16. MR 34-16 | Co, Na, W/Mn$_2$O$_3$ | 0.03 | 0.04 | 0.5 | — | — | 0.03 | 0.03 | — | — |
| 17. MR 34-17 | Co, Na, W/Mn$_2$O$_3$ | 0.07 | 0.12 | 1.1 | — | — | 0.2 | — | — | — |
| 18. MR 3-18 | Co/Na, W/Mn$_2$O$_3$ | 0.07 | 0.12 | 1.1 | — | — | 0.28 | — | — | — |
| 19. MR 3-19 | Co, Na, W/Mn$_2$O$_3$ | 0.07 | 0.12 | 1.1 | — | — | 0.3 | — | — | — |
| 20. MR 40 | Na, W/SiO$_2$ | 1 | 1 | — | — | 1 | — | — | — | — |
| 21. MR 41 | BaW/SiO$_2$ | — | 1 | — | — | 1 | — | — | — | 1 |
| 22. MR 42 | Na, Ba/Ti/SiO$_2$ | 1 | 1 | — | — | 1 | — | — | — | 1 |
| 23. MR 43 | Na, Mn, W/SiO$_2$ | 0.5 | 1 | 1 | — | — | 1 | — | — | — |
| 24. MR 44 | BaWO$_4$ | — | 1 | — | — | — | — | — | — | 1 |
| 25. MR 45 | Ba, W/SiO$_2$ | — | 1 | — | — | 2 | — | — | — | 1 |
| 26. MR 46 | Ba, Mo/SiO$_2$ | — | — | — | — | 1 | — | — | 1 | 1 |

TABLE 2

Additional Catalysts.

| Catalyst | Catalyst Formulation | Na (mol) | W (mol) | Mn (mol) | Ti (mol) | Si (mol) | Co (mol) | La (mol) | Ca (mol) | Cs (mol) |
|---|---|---|---|---|---|---|---|---|---|---|
| 27. MR34-20 | Na, Co, W/Mn2O3 | 0.07 | 0.12 | 1.1 | — | — | 0.5 | — | — | — |
| 28. MR34-21 | Na, Co, W/Mn2O3 | 0.03 | 0.06 | 0.5 | — | — | 0.5 | — | — | — |

TABLE 2-continued

Additional Catalysts.

| Catalyst | Catalyst Formulation | Na (mol) | W (mol) | Mn (mol) | Ti (mol) | Si (mol) | Co (mol) | La (mol) | Ca (mol) | Cs (mol) |
|---|---|---|---|---|---|---|---|---|---|---|
| 29. MR34-22 | Na, Co, W/Mn2O3 | 0.03 | 0.06 | 0.5 | — | — | 1 | — | — | — |
| 30. MR34-18 II | Na, Co, W/Mn2O3 | 0.07 | 0.12 | 1.1 | — | — | 0.28 | — | — | — |
| 31. MR34-18 III | Na, Co, W/Mn2O3 | 0.14 | 0.24 | 2.2 | — | — | 0.5 | — | — | — |
| 32 MR34-18 IV | NaCoW/Mn2O3 | 0.14 | 0.24 | 2.2 | — | — | 0.5 | — | — | — |
| 33. MR34-18 V | Na, Co, W/Mn2O3 | 0.14 | 0.24 | 2.2 | — | — | 0.5 | — | — | — |
| 34 MR34-18 VI | Na, Co, W/Mn2O3 | 0.07 | 0.09 | 1.1 | — | — | 0.28 | — | — | — |
| 35 MR34-18 VII | La, Na, Co, W/Mn2O3 | 0.07 | 0.12 | 1.1 | — | — | 0.28 | 0.008 | — | — |
| 36. MR34-18 VIII | Na, Co, W/Mn2O3 | 0.07 | 0.07 | 1 | — | — | 0.07 | — | — | — |
| 37. MR34-18 IX | Co, W/Mn2O3 | — | 0.12 | 1.1 | — | — | 0.28 | — | — | — |
| 38. MR34-18 X | Na, Ca, Co, W/Mn2O3 | 0.07 | 0.07 | 0.9 | — | — | 0.07 | — | 0.3 | — |
| 39. MR34-18 XI | Na, Co, W/Mn2O3 | 0.07 | 0.12 | 1.1 | — | — | 0.28 | — | — | — |
| 40. MR34-18 XII | Cs, Co, W/Mn2O3 | — | 0.12 | 1.1 | — | — | 0.28 | — | — | 0.07 |
| 41. MR34-18 XIII | Na, Co, W, MnO, Mn2O3 | 0.07 | 0.12 | 1.1 | — | — | 0.28 | — | — | — |

Example 2

Reaction Parameters

The mixed metal oxide catalysts in the following examples are placed in a tubular reactor with a thermowell (FIGS. 1A, 1C). Some experiments utilized an unlined titanium reactor that was pre-treated to oxidize the internal surface area prior to use.

FIGS. 1A-1C show a reactor with bottom feeding of the input gases, and where the catalyst bed is configured as three layers i. quartz packing, ii. catalyst, iii. quartz packing.

A feed gas stream comprising methane, steam, nitrogen as an internal standard and an oxygen-containing gas is contacted with one of the catalysts in a reaction zone maintained at a temperature sufficiently high to effectively produce an effluent stream comprising organic compounds with carbon numbers of 2 or more, un-reacted methane, carbon monoxide, carbon dioxide, hydrogen and the internal standard nitrogen.

The hydrocarbon feedstock may be any hydrocarbon having a low boiling point, such as methane, natural gas, associated gas (natural gas which is found in association with crude oil either dissolved in the oil or as a cap of free gas above the oil), or ethane. The hydrocarbon feedstock may be a gas arising from naturally occurring reserves of methane which contain carbon dioxide. In one embodiment the feedstock comprises at least 10% by volume methane; in another embodiment the feedstock comprises at least 75% by volume methane; and in another embodiment the feedstock comprises at least 80% by volume methane. In general the methane concentration in the feed gas mixture may be in the range of about 10% to about 80%. Other higher carbon number feedstocks, such as middle distillates, can be heated to a gas and utilized with embodiments of the present invention; however, the resulting products may differ depending upon the nature of the feedstock. The methane gas used for the feedstock had a purity of 99.9%.

The hydrocarbon feedstock is in the gaseous phase when contacting the catalyst. The hydrocarbon feedstock is contacted with the catalyst as a mixture with an oxygen-containing gas, such as pure oxygen. The oxygen-containing gas may also comprise CO, nitrogen and/or $CO_2$ in addition to steam and oxygen.

The catalyst is initially heated, and after ignition the reaction conditions are maintained to promote continuation of this process. In the experimental reactor the rate of heat loss is greater than the heat generated by reaction. However, the reaction may be close to adiabatic with larger reactor designs and further balancing of the endothermic and exothermic reaction conditions. Parameters such as the residence time, amount of feed preheat and amount of nitrogen or steam dilution, if used, also affect the reaction products. In one embodiment, a catalyst residence time of no more than about 1000 milliseconds for the reactant gas mixture is maintained. Other embodiments employ catalyst residence times of between about 200 milliseconds to about 500 milliseconds, and other embodiments employ catalyst residence times of about 300 milliseconds to about 400 milliseconds.

The process may be operated at various pressures depending on the desired output composition. The pressures may be from about 0.5 atm to about 50 atm, (where 1 atm is equal to 101.325 kPa), preferably from about 50 kPa to 5,000 kPa.

The process is operated at temperatures ranging from about 600 degrees C. to about 1000 degrees C., and in another embodiment the temperature ranges from about 650 degrees C. to about 950 degrees C. In one embodiment, the hydrocarbon feedstock, steam and the oxygen-containing gas are preheated before contact with the catalyst.

The hydrocarbon feedstock and the oxygen-containing gas are passed over the catalyst, using any of a variety of space velocities. Space velocities for the process, stated as gas hourly space velocity ("GHSV") ranged from about 300 to about 15,000 volumes reactant per volume of catalyst per hour; in one embodiment, the GHSV ranged from about 2000 to about 10,000 volumes reactant per volume of catalyst per hour. Units of gas flow were measured as normal liters of gas per liter of catalyst per hour (NL/Lh) and ranged from about 1000 to about 30,000 NL/Lh; in one embodiment, the gas flow ranged from about 2000 to about 10,000 NL/Lh The effluent stream of product gases emerges from the reactor.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims. The disclosures of all patents and publications cited herein are incorporated by reference in their entirety.

Example 3

Other Parameters; Definitions

The following measurement techniques and definitions apply to the examples:
1. Liquid flow rates were metered by use of syringe pumps and/or positive displacement pumps. In each case the pumps were calibrated for the particular flow settings.
2. Gas flow rates were measured with mass flow meters and reported as gas flow rates at 0 degrees C. and 1 atmosphere (101.325 kPa).
3. Composition of the gas feed was calculated based on flow rates determined from the mass flow meters. The gas composition as measured by gas chromatography was also determined to be the same as the composition calculated from the mass flow meters.
4. The composition of the exit gases from the reactor was measured by gas chromatography using a gas chromatograph calibrated with standard gas mixtures. An internal standard of nitrogen was used to calculate the exit flow rate of the gas from the reactor in most cases. However, in some cases a carbon balance was forced. The two methods resulted in essentially the same conversions, selectivities and yields.
5. Condensed water from the reactor was collected and measured gravimetrically. Calculated wet basis measurements were based on including the water reactant products in the total reactant weight.
Dry basis measurements were calculated by eliminating all water from the reactor outlet and then calculating weight ratios.
6. Temperatures in the reactor were measured by use of a thermocouple that could be moved up and down within a thermowell inserted into the center of the reactor.
7. Space velocities were calculated as volumetric feed rate of the gas feed calculated at 0 degrees C. and 1 atmosphere (101.325 kPa), divided by the volume of the catalyst. In some cases weight hourly space velocities ("WHSV") are reported and these were based either on the total mass flow rate of the feed divided by the mass of catalyst or the mass flow rate of methane divided by the total mass of catalyst.
8. Conversion ("Conv") of methane is calculated as the moles of methane fed minus the moles of methane in the reactor exit and this difference is divided by the methane fed. The percent conversion is 100 times the fractional conversion.
9. Conversion of oxygen is calculated as the moles of oxygen fed minus the moles of oxygen in the reactor exit and this difference is divided by the oxygen fed. The percent conversion is 100 times the fractional conversion.
10. Selectivity ("Sel") is calculated by two methods:
    a) Utilizing the total flow rate that is calculated using nitrogen as a tie component, i.e., forcing a nitrogen balance and the exit composition of the gas leaving the reactor. The ethylene produced times 2 divided by the methane consumed is equal to the ethylene selectivity.
    b) The second method forces a carbon balance and calculates the selectivity from only the exit composition of the gas from the reactor. These two methods should give the same results unless there are measurements or analytical errors.

The two methods gave an indication of the error in the measurements and the assumption that there is no coking of the reactor. In the case of hydrocarbon feeds having carbon numbers greater than that of propane, the differences in selectivity indicates the accumulation of carbon, in the form of coke, inside the reactor.
11. Yield is the product of the conversion times the selectivity. Ultimate yield for a process with recycling of the gasses is equal to the selectivity for the single pass reactor experiments.

Yield=(Conv)(Select)

Ultimate yield=selectivity
12. The phrase "distributed oxygen feed" refers to a two reactor system with feeding half of the oxygen to the reactor system to each of the first and second reactors or stages. For a multi-stage reactor system, the amount of oxygen fed to each reactor would be proportionate to the number of reactors in the system.
13. "Interstage cooling" refers to the condition of cooling the effluent from the first reactor prior to feeding effluent to the second reactor.
14. Residence time for the feed gas is calculated as a function of the average temperature over the catalyst bed, and the volume of the catalyst. The catalyst volume (V) includes the volume of the solid particles in the reactor, and any void space among the particles. Residence time ($res_t$) is obtained by taking the catalyst volume V and dividing it (V) by the volumetric feed rate evaluated at the average bed temperature. Residence time, $res_t$, is expressed in milliseconds.
15. For nomenclature purposes, reference to Groups from the Periodic Table of the Elements refers to the CAS Groups, as listed in the Handbook of Chemistry and Physics, D. R. Lide (ed.), $84^{th}$ edition, 2003-2004, CRC Press, Boca Raton, Fla.

Example 4

Effect of Co Na W/Mn Oxide Catalyst on Methane Oxidation

In this Example, the reactor was loaded with a volume of 20.00 cc of catalyst, weighing 41.81 g. The catalyst was catalyst #18 (Co, Na, W/Mn oxide, Table 1) prepared as described in Example 1. The composition of the feed gas, flow rate, analysis of the reaction products and the extent of conversion to, and selectivity for, hydrocarbons with carbon numbers greater than two, are described in Table 3.

The results (Table 3) show a high level of methane conversion with a yield of organic compounds with carbon number greater than 2 ($C_2+$ yield) of 29%.

The reactor was run for several days with no apparent deactivation of the catalyst. Upon removal of the catalyst no carbon build-up was observed on the catalyst.

TABLE 3

Effects of Co, Na, W/Mn oxide catalyst on methane conversion.
Catalyst; 1.00-1.68 mm granules

| Feed Gas mol % | | |
|---|---|---|
| | $N_2$, ml/min | 108.3 |
| | $O_2$, ml/min | 112.7 |
| | $CH_4$, ml/min | 225.5 |
| | Steam, g/hr | 21.6 |

Total Gas flow rate GHSV = 2678

| Reactor outlet Components | Mol % |
|---|---|
| $H_2$ | 0.86 |
| $O_2$ | |
| $N_2$ | |
| CO | 9.83 |
| $CH_4$ | |
| $CO_2$ | 11.40 |
| $C_2H_4$ | 10.60 |
| $C_2H_6$ | 3.84 |
| $C_3H_8$ | 0.14 |
| $C_3H_6$ | 0.57 |
| $I-C_4H_{10}$ | |
| $N-C_4H_{10}$ | 0.02 |
| $C_4H_8$ | 0.11 |
| $C_5H_{12}$ | |
| $C_5H_{10}$ | |
| $C_6$+nonarom | 0.02 |
| Benzene | 0.02 |
| Toluene | 0.01 |
| Xylene | |
| Arom $C_{9+}$ | |
| $C_2$ Sel, % | 54 |
| $C_{2+}$ Sel, % | 61 |
| $C_2$ Yield, % | 26 |
| $C_{2+}$ Yield, % | 29 |
| Methane Conversion | 48 |
| Oxygen Conversion | 95 |

Example 5

Effects of Different Catalyst Compositions on OCM

A series of OCM experiments was carried out using a single reactor system, using a feed gas mixture generally comprising $CH_4$, $O_2$, $N_2$ and $H_2O$ in a ratio of 2:1:1:4, and an individual catalyst composition from among those compositions listed in Tables 1 and 2. The results of these experiments are summarized below (Table 4), and the data for $CH_4$ Conversion, $C_{2+}$ Selectivity, and $C_{2+}$ Yield represents the range of data from multiple experiments. Although not shown in Table 4 below, other parameters such as the feed gas flow (as GSHV), residence time, pressure, average and maximum temperatures, variations in the feed gas mixture, oxygen conversion, and $CO_x$ selectivity were also determined, and summarized in Table 5 (data expressed as the range from multiple experiments).

TABLE 4

Effects of Different Catalyst Compositions on OCM and Yield of $C_{2+}$ Compounds.

| Sample | Composition | GSHV (l/hr) | $CH_4$ Conversion (%) | $C_{2+}$ Selectivity (%) | $C_{2+}$ Yield (%) |
|---|---|---|---|---|---|
| A | MR34-15-1A | 2700 | 15-49 | 58-75 | 9-28 |
| B | MR34-15-1A | 1750 | 78-79 | 58-59 | 28.3 |
| C | MR34-15-IAB | 1800 | 43-49 | 61-65 | 28.3 |
| D | MR34-15-IAB | 2700 | 44 | 59-65 | 29 |
| E | MR34-16-1 | 2700 | 27-49 | 60-63 | 17-29 |
| F | MR34-17-1 | 2500-2700 | 16-49 | 58-69 | 12-28 |
| G | MR34-17-I B | 2700 | 17-37 | 64-67 | 11-24 |
| H | MR34-17-I B | 5300 | 37-42 | 56-63 | 23-25 |
| I | MR34-20-I | 2700 | 35-48 | 58-65 | 17-28 |
| J | MR34-21-IA | 2700 | 21-46 | 58-64 | 13-27 |
| K | MR34-19-I | 2700/6500 | 20-36 | 60-73 | 14-22 |
| L | MR34-19-I | 6500 | 17-23 | 71-73 | 12-16 |
| M | MR34-18-VII | 2600-2700 | 32-47 | 61-68 | 21-28 |
| N | MR34-18-VII | 1800-4300 | 29-42 | 58-73 | 21-28 |
| O | MR34-18-XXIII | 2600 | 29-43 | 57-73 | 18-26 |
| P | MR34-18-XXIII | 2600-6200 | 13-34 | 61-73 | 12-21 |
| R | MR34-18-XIV | 2600 | 34-48 | 19-61 | 19-27 |
| S | MR34-18-XIV | 2600/6000 | 21-40 | 61-72 | 15-24 |
| T | MR34-18-XV | 2600 | 31-48 | 54-60 | 19-27 |
| U | MR34-18-XV | 2600/6000 | 21-43 | 57-72 | 16-25 |
| V | MR34-18-XV | 2600-6200 | 19-41 | 56-78 | 14-25 |
| W | MR34-18-XVI | 2600 | 34-37 | 60-62 | 21-23 |
| X | MR34-18-XVI | 1800-6000 | 18-45 | 55-71 | 14-24 |
| Z | MR34-18-XVI | 2600-6200 | 35-43 | 59-71 | 17-25 |
| AA | MR34-18-XVI | 2600, varied feed gas mixtures | 35-48 | 58-66 | 26-27 |
| AB | MR34-18-XVI | 2600, varied Feed gas mixtures | 31-44 | 58-70 | 22-26 |
| AC | MR34-18-XVII | 2600 | 34-48 | 53-60 | 21-26 |
| AD | MR34-18-XVII | 1800-6000 | 19-45 | 51-69 | 13-25 |
| AE | MR34-22-I | 2700 | 35-47 | 54-59 | 20-28 |

TABLE 5

Summary of Reactions for Methane Oxidation to Ethylene (OCM)

| Code | Run No. | GSHV 1/hr | Res t, ms* | L Vel cm/s | P psig | Taver C. | Tmax C. | Feed Gas Composition | Catalyst | Remarks** |
|---|---|---|---|---|---|---|---|---|---|---|
| A | (MR34-15)-IA | 2700 | 362-372 | 46-47 | 0.9-1.8 | 732-827 | 739-852 | CH4:O2:N2:H2O (2:1:1:4) (4:1:1:4) | (MR34-15)-IA 20 cc/42.18; 0.45~1.17 mm | Single reactor a; CH4 conv 15-78% and O2 conv 31-100% C2+ sel 57-75%; COx sel 24-40% and C2+ yield 9-28.3%. |
| B | (MR34-15)-IA | 1750 | 579 | 29 | 1.5 | 792-794 | 799-802 | CH4:O2:N2:H2O (2:1:1:4) | (MR34-15)-IA 20 cc 42.18 0.45-1.17 mm | Single reactor a CH4 conv 78-79% and O2 conv 97% C2+ sel 58-59%; COx sel 39-40% and C2+ yield 28.29%. |

TABLE 5-continued

Summary of Reactions for Methane Oxidation to Ethylene (OCM)

| Code | Run No. | GHSV 1/hr | Res t, ms* | L Vel cm/s | P psig | Taver C. | Tmax C. | Feed Gas Composition | Catalyst | Remarks** |
|------|---------|-----------|------------|------------|--------|----------|---------|----------------------|----------|-----------|
| C | (MR34-15)-IAB | 1800 | 577 | 44 | 1.0-1.6 | 733-768 | 758-800 | $CH_4:O_2:N_2:H_2O$ (2:1:1:4) | (MR34-15)-IAB-01 30 cc/58.88; 0.45~1.17 mm | Single reactor a $CH_4$ conv 43-49% and $O_2$ conv 82-95% C2+ sel 61-65%; $CO_x$ sel 33-37% and C2+ yield 28.30%. |
| D | (MR34-15)-IAB | 2700 | 468 | 55 | 4.5-5.5 | 774 | 806 | $CH_4:O_2:N_2:H_2O$ (2:1:1:4) | (MR34-15)-IAB-02 30 cc/58.88; 0.45~1.17 mm | Single reactor a $CH_4$ conv 44% and $O_2$ conv 80% C2+ sel 65-59%; $CO_x$ sel 33% and C2+ yield 29%. |
| E | (MR34-16)-I- | 2700 | 362-372 | 41-42 | 1.0-1.2 | 735-823 | 744-843 | $CH_4:O_2:N_2:H_2O$ (2:1:1:4) | (MR34-16)-I-01 18 cc/37.28; 0.45~1.17 mm | Single reactor a $CH_4$ conv 27-49% and $O_2$ conv 55-96% C2+ sel 60-63%; $CO_x$ sel 35-38% and C2+ yield 17-29%. |
| F | (MR34-17)-I- | 2500-2700 | 366-400 | 42-46 | 1.0-1.7 | 753-827 | 762-844 | $CH_4:O_2:N_2:H_2O$ (2:1:1:4) | (MR34-18)-I 20 cc/40.19 ~1.17 mm | Single reactor a $CH_4$ conv 16-49% and $O_2$ conv 43-96% C2+ sel 58-69%; $CO_x$ sel 35-39% and C2+ yield 12-28%. |
| G | (MR34-17)-IB | 2700 | 363 | 40-47 | 0.9 | 733-793 | 734-804 | $CH_4:O_2:N_2:H_2O$ (2:1:1:4) | (MR34-17)-I 20 cc/42.26 ~1.17 mm | Single reactor a $CH_4$ conv 17-37% and $O_2$ conv 31-58% C2+ sel 64-67%; $CO_x$ sel 30-34% and C2+ yield 11-24%. |
| H | (MR34-17)-IB | 5400 | 363 | 47 | 16 | 779-791 | 788-803 | $CH_4:O_2:N_2:H_2O$ (2:1:1:4) | (MR34-17)-I 20 cc/42.26 ~1.17 mm | Single reactor a $CH_4$ conv 37-42% and $O_2$ conv 67-84% C2+ sel 59-63%; $CO_x$ sel 34-39% and C2+ yield 23-25%. |
| I | (MR34-20)-IA | 2700 | 373-412 | 41-46 | 1.3-3.6 | 776-792 | 780-802 | $CH_4:O_2:N_2:H_2O$ (2:1:1:4) | (MR34-20)-I-01 20 cc/42.01 ~1.17 mm | Single reactor a $CH_4$ conv 35-48% and $O_2$ conv 71-99% C2+ sel 58-65; $CO_x$ sel 32-39% and C2+ yield 17-28%. |
| J | (MR34-21)-IA | 2700 | 371-383 | 44-46 | 10-.2.2 | 743-792 | 775-800 | $CH_4:O_2:N_2:H_2O$ (2:1:1:4) | (MR34-21)-I 20 cc/43.76 ~1.17 mm | Single reactor a $CH_4$ conv 21-46% and $O_2$ conv 43-92% C2+ sel 58-64%; $CO_x$ sel 34-40% and C2+ yield 13-27%. |
| K | (MR34-19)-IA | 2700 6500 | 371 167 | 57 126 | 1.2-.2.8 | 774-791 | 776-796 | $CH_4:O_2:N_2:H_2O$ (2:1:1:4) | (MR34-19)-I-01 25 cc/50.68 ~1.17 mm | Single reactor a $CH_4$ conv 20-36% and $O_2$ conv 35-70% C2+ sel 60-73%; $CO_x$ sel 25-38% and C2+ yield 14-22%. |
| L | (MR34-19)-IA | 6500 | 175 | 123 | 3.0-3.4 | 758-775 | 763-781 | $CH_4:O_2:N_2:H_2O$ (2:1:1:4) | (MR34-19)-I-01 25 cc/50.68 ~1.17 mm | Ti-reactor (12.6 mm ID w/3 mm 304 SS thermowell); $CH_4$ conv 17-23% and $O_2$ conv 30-39% C2+ sel 71-73%; $CO_x$ sel 25-27% and C2+ yield 12-16%. |
| M | (MR34-18)-VII | 2600-2700 | 357-375 | 55-57 | 0.9-1.1 | 781-809 | 785-825 | $CH_4:O_2:N_2:H_2O$ (2:1:1:4) | (MR34-18)-VII-2C 38 cc/95 gr; ~1.41 mm | Single reactor d $CH_4$ conv 32-47% and $O_2$ conv 54-87% C2+ sel 61-68%; $CO_x$ sel 30-37% and C2+ yield 21-28%. |
| N | (MR34-18)-VII | 1800 2700 4300 | 535 362 247 | 38 56 83 | 0.9 1.3 2.3 | 791-787 | 798-801 | $CH_4:O_2:N_2:H_2O$ (2:1:1:4) | (MR34-18)-VII-2C 38 cc/95 gr; ~1.41 mm | Single reactor d $CH_4$ conv 49-29% and $O_2$ conv 95-56% C2+ sel 58-73%; $CO_x$ sel 40-25% and C2+ yield 28-21%. |

TABLE 5-continued

Summary of Reactions for Methane Oxidation to Ethylene (OCM)

| Code | Run No. | GHSV 1/hr | Res t, ms* | L Vel cm/s | P psig | Taver C. | Tmax C. | Feed Gas Composition | Catalyst | Remarks** |
|---|---|---|---|---|---|---|---|---|---|---|
| O | (MR34-18)-XXIII | 2600 | 362-354 | 37-38 | 0.5-0.8 | 780-824 | 785-832 | CH4:O2:N2:H2O (2:1:1:4) | (MR34-18)-XXIII 25 cc//60 gr; ~1.41 mm | Single reactor d CH4 conv 29-43% and O2 conv 56-85% C2+ sel 57-73%; C0x sel 36-41% and C2+ yield 18-26%. |
| P | (MR34-18)-XXIII | 2600 4000 6200 | 361 237 160 | 37 57 84 | 0.6 0.8 1.2 | 795-791 | 800 | CH4:O2:N2:H2O (2:1:1:4) | (MR34-18)-XXIII 25 cc//60 gr; ~1.41 mm | Single reactor d CH4 conv 34-17% and O2 conv 59-22% C2+ sel 61-73%; C0x sel 36-27% and C2+ yield 21-12%. |
| Q | (MR34-18)-XXIII | 2600 4000 | 365 242 | 37 57 | 0.7 0.9 | 794 | 800 | CH4:O2:N2:H2O (2:1:1:6) | (MR34-18)-XXIII 25 cc//60 gr; ~1.41 mm | Single reactor d CH4 conv 38-29% and O2 conv 67-46% C2+ sel 62-69%; C0x sel 36-29% and C2+ yield 23-20%. |
| R | (MR34-18)-XIV | 2600 | 363-386 | 35-37 | 0.5-1.0 | 768-819 | 775-835 | CH4:O2:N2:H2O (2:1:1:4) | (MR34-18)-XIV 25 cc//61 gr; ~1.41 mm | Single reactor d CH4 conv 34-48% and O2 conv 54-94% C2+ sel 19-61%; C0x sel 34-42% and C2+ yield 19-27%. |
| S | (MR34-18)-XIV | 2600 6000 | 363 167 | 37 81 | 0.6 1.5 | 791-787 | 799-801 | CH4:O2:N2:H2O (2:1:1:4) | (MR34-18)-XIV 25 cc//61 gr; ~1.41 mm | Single reactor d CH4 conv 40-21% and O2 conv 75-34% C2+ sel 61-72%; C0x sel 37-26% and C2+ yield 24-15%. |
| T | (MR34-18)-XV | 2600 | 363 | 37 | 0.5-0.6 | 771-820 | 776-835 | CH4:O2:N2:H2O (2:1:1:4) | (MR34-18)-XV 25 cc//61 gr; ~1.41 mm | Single reactor d CH4 conv 31-48% and O2 conv 56-96% C2+ sel 54-60%; C0x sel 34-42% and C2+ yield 19-27%. |
| U | (MR34-18)-XV | 2600 6000 | 370-388 172-191 | 35-37 70-78 | 0.8-1.6 2.2-4.5 | 790-815 | 801-826 | CH4:O2:N2:H2O (2:1:1:4) | (MR34-18)-XV 25 cc//61 gr; ~1.41 mm | Single reactor d CH4 conv 21-43% and O2 conv 35-99% C2+ sel 57-72%; C0x sel 24-40% and C2+ yield 16-25%. |
| V | (MR34-18)-XV | 2600 4000 6200 | 363-381 240-256 167-182 | 35-37 52-56 74-80 | 0.2-0.6 0.9-1.8 1.5-2.8 | 791-794 | 798-801 | CH4:O2:N2:H2O (2:1:1:4) | (MR34-18)-XV 25 cc//61 gr; ~1.41 mm | Single reactor d CH4 conv 19-41% and O2 conv 34-99% C2+ sel 56-78%; C0x sel 19-41% and C2+ yield 14-25%. |
| W | (MR34-18)-XVI | 2600 | 365 | 37 | 0.6 | 780-794 | 786-800 | CH4:O2:N2:H2O (2:1:1:4) | (MR34-18)-XVI 25 cc//61 gr; ~1.41 mm | Single reactor d CH4 conv 34-37% and O2 conv 62-72% C2+ sel 62-60%; C0x sel 36-37% and C2+ yield 21-23%. |
| X | (MR34-18)-XVI | 1800 2600 4000 6000 | 528 381 256 182 | 26 35 52 74 | 0.4 0.6 0.8 1.1 | 778 | 786 | CH4:O2:N2:H2O (2:1:1:4) | (MR34-18)-XVI 25 cc//61 gr; ~1.41 mm | Single reactor d CH4 conv 45-18% and O2 conv 90-31% C2+ sel 55-71%; C0x sel 43-26% and C2+ yield 24-14%. |
| Y | (MR34-18)-XVI | 2600 3800 6000 | 370 256 168 | 36 53 80 | 0.7 1.0 1.5 | 788 | 799 | CH4:O2:N2:H2O (2:1:1:4) | (MR34-18)-XVI 25 cc//61 gr; ~1.41 mm | Single reactor d CH4 conv 43-35% and O2 conv 83-39% C2+ sel 59-71%; C0x sel 39-27% and C2+ yield 25-17%. |
| Z | (MR34-18)-XVI | 2600 | 377 | 36 | 0.9 1.0 1.0 | 790 | 800 | CH4:O2:N2:H2O (2:1:1:4) (2:1:1:6) (3:1:1:6) | (MR34-18)-XVI 25 cc//61 gr; ~1.41 mm | Single reactor d CH4 conv 45-38% and O2 conv 85-94% C2+ sel 58-66%; C0x sel 40-32% and C2+ yield 26-27%. |

TABLE 5-continued

Summary of Reactions for Methane Oxidation to Ethylene (OCM)

| Code | Run No. | GHSV 1/hr | Res t, ms* | L Vel cm/s | P psig | Taver C. | Tmax C. | Feed Gas Composition | Catalyst | Remarks** |
|---|---|---|---|---|---|---|---|---|---|---|
| AA | (MR34-18)-XVI | 2600 | 372 | 36 | 1.1<br>1.3<br>1.3 | 790 | 800 | CH4:O2:N2:H2O<br>(2:1:1:4)<br>(4:1:1:4)<br>(4:1:1:5) | (MR34-18)-XVI<br>25 cc//61 gr;<br>~1.41 mm | Single reactor d<br>CH4 conv 44-31% and<br>O2 conv 85-93%<br>C2+ sel 58-70%;<br>COx sel 40-28% and<br>C2+ yield 26-22%. |
| AB | (MR34-18)-XVII | 2600 | 355-372 | 36-38 | 0.5-0.8 | 780-807 | 786-824 | CH4:O2:N2:H2O<br>(2:1:1:4) | (MR34-18)-XVII<br>25 cc//61 gr;<br>~1.41 mm | Single reactor d<br>CH4 conv 34-48% and<br>O2 conv 62-84%<br>C2+ sel 53-60%;<br>COx sel 37-45% and<br>C2+ yield 21-26%. |
| AC | (MR34-18)-XVII | 1800<br>2600<br>4000<br>6000 | 524<br>366<br>241<br>165 | 26<br>37<br>56<br>81 | 0.4<br>0.6<br>0.8<br>1.2 | 780 | 786 | CH4:O2:N2:H2O<br>(2:1:1:4) | (MR34-18)-XVII<br>25 cc//61 gr;<br>~1.41 mm | Single reactor d<br>CH4 conv 19-45% and<br>O2 conv 32-92%<br>C2+ sel 51-69%;<br>COx sel 29-45% and<br>C2+ yield 13-25%. |
| AD | (MR34-22)-I | 2700 | 371-372 | 46 | 1.0-1.7 | 777-822 | 778-828 | CH4:O2:N2:H2O<br>(2:1:1:4) | (MR34-22)-I<br>20 cc/48.77<br>~1.17 mm | Single reactor a<br>CH4 conv 35-47% and<br>O2 conv 76-96%<br>C2+ sel 54-59%;<br>COx sel 40-43% and<br>C2+ yield 20-28%. |
| AE | (MR34-18)-(XVII + XXVI) | 2600 | 361-371 | 36-37 | 0.7-0.9 | 780-807 | 786-823 | CH4:O2:N2:H2O<br>(2:1:1:4) | (MR34-18)-<br>(XVII + XXVI)<br>25 cc//61 gr;<br>~1.41 mm | Single reactor d<br>CH4 conv 21-46% and<br>O2 conv 33-92%<br>C2+ sel 56-71%;<br>COx sel 42-26% and<br>C2+ yield 14-27%. |
| AF | (MR34-18)-(XVII + XXVI) | 1800<br>2600<br>4000<br>6000 | 532<br>372<br>245<br>167 | 25<br>36<br>55<br>81 | 0.4<br>0.7<br>0.9<br>1.3 | 780 | 786 | CH4:O2:N2:H2O<br>(2:1:1:4) | (MR34-18)-<br>(XVII + XXVI)<br>25 cc//61 gr;<br>~1.41 mm | Single reactor d<br>CH4 conv 21-46% and<br>O2 conv 33-92%<br>C2+ sel 56-71%;<br>COx sel 42-26% and<br>C2+ yield 24-14%. |
| AG | (MR34-19)-(MR34-18) | 3160 | 350-368 | 139-149 | 6 12 | App. 800 | App. 800 | CH4:O2:N2:H2O<br>(2:1:1:4) | Two reactor<br>25 cc-25 cc | Dual reactor b<br>CH4 conv 31-47% and<br>O2 conv 60-97%<br>C2+ sel 57-66%;<br>COx sel 15-41% and<br>C2+ yield 20-27%. |
| AH | (MR34-19)-(MR34-18) | 1100<br>2000 | 1011<br>654 | 51<br>78 | 6-13 | <800 | <800 | CH4:O2:N2:H2O<br>(2:1:1:4) | Two reactor<br>25 cc-25 cc | Dual reactor b<br>CH4 conv 41-48% and<br>O2 conv 85-100%<br>C2+ sel 55-59%;<br>COx sel 42-49% and<br>C2+ yield 24-26%. |

*Res t (ms) = Residence time, in milliseconds.
**Remarks.
Reactor a = Single titanium reactor, 12.6 mm inner diameter, with 3 mm 304 stainless steel thermowell.
Reactor b = Dual titanium reactors, 12.6 mm inner diameter, each with 3 mm 304 stainless steel thermowell.
Reactor c = Single 1.25 inch (31.8 mm) outer diameter 304 stainless steel reactor with 3 mm 304 stainless steel thermowell.
Reactor d = Single 0.75 inch (19.1 mm) outer diameter 304 stainless steel reactor with 3 mm 304 stainless steel thermowell.

Example 6

Effects of Catalyst Mixtures on OCM

A series of OCM experiments was carried out using a single reactor system, using a feed gas mixture generally comprising $CH_4$, $O_2$, $N_2$ and $H_2O$ in a ratio of 2:1:1:4, and a catalyst composition that was a mixture of catalyst preparations from among those compositions listed in Tables 1 and 2. The results of these experiments are summarized below (Table 6), and the data for $CH_4$ Conversion, $C_{2+}$ Selectivity, and $C_{2+}$ Yield represents the range of data from multiple experiments. Although not shown in Table 6 below, other parameters such as the feed gas flow (as GSHV), residence time, pressure, average and maximum temperatures, variations in the feed gas mixture, oxygen conversion, and $CO_x$ selectivity were also determined, and summarized in Table 5 (data expressed as the range from multiple experiments)

TABLE 6

Effects of Catalyst Mixtures on OCM and Yield of $C_{2+}$ Compounds.

| Sample | Composition | GSHV (l/hr) | $CH_4$ Conversion (%) | $C_{2+}$ Selectivity (%) | $C_{2+}$ Yield (%) |
|---|---|---|---|---|---|
| AG | MR34-18-XVII + XXVI | 2600 | 21-46 | 56-71 | 14-27 |
| AH | MR34-18-XVII + XXVI | 1800-6000 | 21-46 | 56-71 | 14-24 |

TABLE 6-continued

Effects of Catalyst Mixtures on OCM and Yield of $C_{2+}$ Compounds.

| Sample | Composition | GSHV (l/hr) | $CH_4$ Conversion (%) | $C_{2+}$ Selectivity (%) | $C_{2+}$ Yield (%) |
|---|---|---|---|---|---|
| AI | MR34-19 and MR34-18 | 3160 | 31-47 | 57-66 | 20-27 |
| AJ | MR34-19 and MR34-18 | 1100/ 2000 | 41-48 | 55-59 | 24-26 |

The data shown above indicates the low and high values obtained from multiple experiments. For these experiments, the calcined catalysts were mixed together to give the desired proportions by weight, pressed, granulated and sieved as described in previous examples.

Example 7

X-Ray Diffraction Analysis of Catalyst Compositions

Samples of the catalyst compositions were subjected to X-Ray Diffraction analysis using an XDS 2000 Scintag Inc. analyzer with a Cu—K alpha (1.5406 angstrom) X-ray tube, and Thermo ARL Pertier detector. Data was analyzed using the software program DMSNT v1.39-Ibeta, and compared to those contained in a database of known X-ray diffraction patterns.

A representative XRD pattern of several of the Na, Co, W/Mn oxide (catalyst #18, designated MR34-18) base catalysts is shown in FIG. 2. The catalysts were poly-metal oxides of Na, Mn, W, and Co, and prepared using different oxides of manganese, such as $Mn_2O_3$, gamma $Mn_2O_3$, and $MnO_2$. Generally the XRD patterns for these different catalyst compositions were similar.

The peak intensities of the $Na_2WO_4$ phase of catalyst MR34-18 appeared to be higher than the other peak intensities. The relatively higher OCM activity of this same catalyst preparation obtained during the standard OCM test could be attributed to its higher $Na_2WO_4$ content.

Based on the XRD data, the catalysts have, in general, the same metal oxides crystalline phases: $\gamma$-$Mn_2O_3$, $Mn_2O_3$, $MnO_2$, $CoMn_2O_4$, $(CoMn)(CoMn)_2O_4$, $MnWO_4$, $Na_{0.2}MnO_2$, and $Na_2WO_4$. The $\gamma$-$Mn_2O_3$ phase is reported by researchers to be an isomorph of $Mn_3O_4$ and occurs during the transformation of $Mn_3O_4$ to $\alpha$-$Mn_2O_3$ at certain conditions.

Example 8

Effect of Cobalt and Tungsten Ratio on Catalyst Composition and Catalytic Activity In this Example, a catalyst composition was prepared using a lower ratio of Cobalt and Tungsten than the catalyst used in the previous Examples. The XRD data (FIG. 3) compares the patterns of the fresh and used catalyst (MR34-18)-VII that was prepared with a low ratio of Co and W. Focusing on a specific major peak, the XRD data indicated a decrease in $Na_2WO_4$ phase after the catalyst had been used for multiple OCM experiments. The higher OCM activity of the fresh (MR34-18)-VIII observed during its first OCM tests could be attributed also to its relatively higher, initial $Na_2WO_4$ content.

Example 9

Stability of Catalyst Composition After Repeated Use

A fresh sample of a catalyst preparation, and a sample of that same catalyst that had been used in the OCM reactor for 10 different experiments were subjected to XRD analysis as described in the Examples 7-8.

The results showed no significant changes in the locations and the intensities of the phases detected. The crystallinity of the catalyst was observed to increase after the multiple OCM tests.

Example 10

Effect of a Two Reactor System on Conversion of Methane to Ethylene and Other Products Two Reactor System with Interstage Cooling with and without (w/wo) Distributed Oxygen Feed.

FIG. 1B is a schematic illustration of a dual reactor system. The second reactor contains a preheat section to reheat the effluent from the first stage to the desired temperature prior to contacting the catalyst. FIG. 4 illustrates a method of representing the data for complex reaction systems such as the OCM reaction system. As shown in FIG. 4, the selectivities and yields are strong functions of methane conversions. Not shown in FIG. 4 are the selectivities of $CO_x$, but since the sum of the selectivities should be equal to 1, $CO_x$ selectivities would normally be calculated by subtracting the selectivities of $C_{2+}$ from 1. However, all of the data have been adjusted such that the sum of the selectivities add to 0.98 or 98%.

Example 11

Two-Reactor System: Effects of Flow Direction

A. Upflow-Downflow.

For these experiments, the first reactor was in an upflow manner, and the effluent of the first reactor was run into the top of the second reactor in a downflow manner. Both reactors were titanium, and each reactor contained a stainless steel thermowell. The catalyst sample was placed into each reactor as previously described. The catalyst used was (MR34-18 II)), a Co Na W/Mn oxide catalyst, and the feed composition comprised a mixture of $CH_4$:$O_2$:$N_2$:$H_2O$ at the ratio of (2:1: 1:4). Generally, a single catalyst composition was used in each reactor. FIG. 1 shows reactors run in a series configuration, but it is to be understood that multiple reactors could also be run in a parallel configuration.

The data is shown in Table 7, in which the methane conversion ranged from about 33% to about 49%, and the yield of $C_{2+}$ compounds ranged from about 22% to about 28%. The same catalyst preparation was used for these experiments. Although not shown in Table 7 below, other parameters such as the feed gas flow (as GSHV), residence time, pressure, average and maximum temperatures, variations in the feed gas mixture, oxygen conversion, and $CO_x$ selectivity were also determined, and summarized in Table 8 (data expressed as the range from multiple experiments).

TABLE 7

Effects of Dual Reactors on OCM and Yield of $C_{2+}$ Compounds.

| Sample | Composition | GSHV (l/hr) | $CH_4$ Conversion (%) | $C_{2+}$ Selectivity (%) | $C_{2+}$ Yield (%) |
|---|---|---|---|---|---|
| A | MR34-18-II MR34-18-II | 2700 | 33-42 | 63-69 | 22-27 |
| B | MR34-18-II MR34-18-II | 2700 3000 | 49 | 57 | 28 |
| C | MR34-18-II MR34-18-II | 3200 | 45-47 | 60-61 | 28 |

B. Upflow-Upflow.

For these experiments, both reactors were run in an upflow manner, the effluent gasses from the first reactor also being run in an upflow manner through the second reactor (FIG. 1B). Both reactors were titanium, and each fitted with a stainless steel thermowell to contain the catalyst. The catalyst used was catalyst #18, designated MR34-18 II, the same composition comprising Co, Na, W/Mn oxide as used in part A, above, and the feed composition comprised a mixture of $CH_4:O_2:N_2:H_2O$ at the ratio of 2:1:1:4.

The data is shown in Table 8, in which the methane conversion ranged from about 36% to about 47%, and the yield of $C_{2+}$ compounds ranged from about 25% to about 28%. The same catalyst preparation was used for these experiments. Although not shown in Table 8 below, other parameters such as the feed gas flow (as GSHV), residence time, pressure, average and maximum temperatures, variations in the feed gas mixture, oxygen conversion, and $CO_x$ selectivity were also determined, and summarized in Table 9 (data expressed as the range from multiple experiments).

TABLE 8

Effects of Dual Reactors on OCM and Yield of $C_{2+}$ Compounds.

| Sample | Composition | GSHV (l/hr) | $CH_4$ Conversion (%) | $C_{2+}$ Selectivity (%) | $C_{2+}$ Yield (%) |
|---|---|---|---|---|---|
| D | MR34-18-II<br>MR34-18-II | 3200 | 36-39 | 64-66 | 25 |
| E | MR34-18-II<br>MR34-18-II | 2700<br>3200 | 42-47 | 60-61 | 28 |

TABLE 9

Methane Oxidation to Ethylene: Use of Dual Reactor System

| Prep | Run No. | GHSV 1/hr | Res t, ms* | L Vel cm/s | P psig | Taver C. | Tmax C. | Feed Composition | Catalyst | Remarks** |
|---|---|---|---|---|---|---|---|---|---|---|
| A | (MR34-18 II)-(MR34-18 II) | 2700 | 390-394 | 107-108 | 4.0-5.5 | <800 | <800 | CH4:O2:N2:H2O (2:1:1:4) | Two reactors Upflow/25 cc-Downflow/5cc | Dual titanium reactors a CH4 conv 33-42% and O2 conv 56-77% C2+ sel 63-69%; COx sel 29-35% and C2+ yield 22-27%. |
| B | (MR34-18 II)-(MR34-18 II) | 2700<br>3000 | 410<br>387 | 104<br>110 | 7-9 | >800 | >800 | CH4:O2:N2:H2O (2:1:1:4) | Two reactors Upflow/25 cc-Downflow/25 cc | Dual titanium reactors a CH4 conv 49% and O2 conv 100% C2+ sel 57%; COx sel 40% and C2+ yield 28%. |
| C | (MR34-18 II)-(MR34-18 II) | 3200 | 400 | 107 | 10.6-13.5 | <800 | >800 | CH4:O2:N2:H2O (2:1:1:4) | Two reactors Upflow/25 cc-Downflow/25 cc | Dual titanium reactors a CH4 conv 45-47% and O2 conv 81-89% C2+ sel 60-61%; COx sel 37-38% and C2+ yield 28%. |
| D | (MR34-18 II)-(MR34-18 II) | 3200 | 327 | 130 | 4.4-4.6 | <800 | <800 | CH4:O2:N2:H2O (2:1:1:4) | Two reactors Upflow/25 cc-Upflow/25 cc | Dual titanium reactors a CH4 conv 36-39% and O2 conv 62-68% C2+ sel 64-66%; COx sel 32-33% and C2+ yield 25%. |
| E | (MR34-18 II)-(MR34-18 II) | 2700<br>3200 | 387<br>329 | 110<br>128 | 4.2-5.1 | <800<br>>800 | <800<br><800 | CH4:O2:N2:H2O (2:1:1:4) | Two reactors Upflow/25 cc-Upflow/25 cc | Dual titanium reactors a CH4 conv 42-47% and O2 conv 81-89% C2+ sel 60-61%; COx sel 36-38% and C2+ yield 28%. |
| F | (MR34-18 II)-(MR34-18 II) | 2700 | 420-427 | 100-102 | 6.6-8.2 | <800 | <800 | CH4:O2:N2:H2O (2:1:1:4) | Two reactors with O2 Inject Upflow/25 cc-Upflow/25 cc | Dual titanium reactors a CH4 conv 38-39% and O2 conv 77-90% C2+ sel 60-64%; COx sel 34-38% and C2+ yield 28-29%. |
| G | (MR34-18 II)-(MR34-18 II) | 3200 | 349-381 | 112-122 | 6.0-10.5 | <800 | <800 | CH4:O2:N2:H2O (2:1:1:4) | Two reactors with O2 Inject Upflow/25 cc-Upflow/25 cc | Dual titanium reactors a CH4 conv 37-59% and O2 conv 60-84% C2+ sel 48-68%; COx sel 30-50% and C2+ yield 27-29%. |
| H | (MR34-18 II)-(MR34-18 II) | 3600 | 379 | 113 | 13.5-15.0 | <800 | <800 | CH4:O2:N2:H2O (2:1:1:4) | Two reactors with O2 Inject Upflow/25 cc-Upflow/25 cc | Dual titanium reactors a CH4 conv 59-68% and O2 conv 33-46% C2+ sel 34-43%; COx sel 55-63% and C2+ yield 25%. |

*Res t (ms) = Residence time, in milliseconds.
**Remarks.
Dual titanium reactors a = Dual titanium reactors, each 12.6 mm inner diameter, each with 3 mm 304 stainless steel thermowell.

Example 12

Two-Reactor System: Effects of Oxygen Injection

For these experiments, both reactors were run in an upflow manner, the effluent gasses from the first reactor also being run in an upflow manner through the second reactor. Both reactors were titanium with a stainless steel thermowell. The catalyst used was the same catalyst composition used in Part A above, and the same feed gas composition.

For the experiments with distributed oxygen feeds, an equal amount (whether in moles or volume) was fed on a continuous basis to the first and the second reactors. The gas temperature between the two reactors cooled from the temperature of the first reactor to a temperature that was less than about 600 degrees C., generally to a temperature about 400 degrees C., and was then fed to the preheat section of the second reactor. The second oxygen feed entered the system after the reaction mixture had cooled to about 400 degrees C. The ratio of methane to oxygen reported for the example was for the system of two reactors, i.e., methane feed to the first reactor divided by the oxygen feed to the first reactor plus the oxygen feed (interstage feed/injection) to the second reactor. Only the oxygen feed to the system was split between the first and second reactors (see FIG. 1B). Although not shown in Table 10 below, other parameters such as the feed gas flow (as GSHV), residence time, pressure, average and maximum temperatures, variations in the feed gas mixture, oxygen conversion, and $CO_x$ selectivity were also determined, and summarized in Table 9 (data expressed as the range from multiple experiments).

The data is shown in Table 10, in which the methane conversion ranged from about 39% to about 68%, and the yield of $C_{2+}$ compounds ranged from about 25% to about 29%. The same catalyst preparation was used for these experiments.

TABLE 10

Effects of Dual Reactors on OCM and Yield of $C_{2+}$ Compounds.
Direction of Both Reactors: Upflow

| Sample | Composition | GSHV (l/hr) | $CH_4$ Conversion (%) | $C_{2+}$ Selectivity (%) | $C_{2+}$ Yield (%) |
|---|---|---|---|---|---|
| F | MR34-18-II<br>MR34-18-II | 2700 | 38-39 | 60-64 | 28-29 |
| G | MR34-18-II<br>MR34-18-II | 3200<br>3000 | 37-59 | 48-68 | 27-29 |
| H | MR34-18-II<br>MR34-18-II | 3600 | 59-68 | 34-43 | 25 |

Example 13

Effects of Other Catalyst Compositions

These experiments utilized a single stainless steel reactor with a stainless steel thermowell. Generally, the feed gas composition was the same as described in Parts A-C of the prior Example, and with variations of the gas mixture that are indicated in the "Feed Composition" column of Table 11.

Catalyst 18, designated (MR34-18 III) effected a methane conversion ranging from 34-49%, and a $C_{2+}$ yield of 28%. As shown in Table 11, many variations of this catalyst embodiment were capable of effecting methane oxidation with yield of $C_{2+}$'-end products in excess of 20%.

Variations in the GSHV, residence time, and ratios of the feed gas mixture also showed a range of mixtures that could effect methane oxidation with yield of $C_{2+}$'-end products in excess of 20%, and in some instances, as high as 27-29%, could be obtained using a single reactor, but with variations in the feed gas mixture from 2:1:1:4 to 2:1:1:12 ($CH_4:O_2:N_2:H_2O$), variations in the gas flow rate (GSHV) from 1500-6000, and with residence times ranging from as low as about 150 to as high as about 650 milliseconds; several embodiments were effective with residence times ranging from about 163 ms to about 650 ms; and other embodiments residence times of from about 250 ms to about 400 ms were effective.

TABLE 11

Effect of Feed Gas Composition, Flow Rate, Residency Times on Methane Oxidation to Ethylene

| Prep | Run No.* | GHSV 1/hr | Res t, ms* | L Vel cm/s | P psig | Taver C. | Tmax C. | Feed Composition | Catalyst | Remarks** |
|---|---|---|---|---|---|---|---|---|---|---|
| 1 | (MR34-18 III) | 2683 | 591 | 36 | 9-11 | ~670 | ~800 | CH4:O2:N2:H2O (2:1:1:4) | (MR34-18)-III; used 25 cc/55 gr; ~1.17 mm | Single titanium reactor a CH4 conv 25-27% and O2 conv 71-74% C2+ sel 73-74%; COx sel 23-25% and C2+ yield 20%. |
| 2 | (MR34-18)-VI | 2000 | 461 | 18 | 0.5 | 790-818 | 836-858 | CH4:O2:N2:H2O (2:1:1:4) | (MR34-18)-VI 42 cc/111 gr; ~1.41 mm | Single reactor c CH4 conv 31-32% and O2 conv 100% C2+ sel 67-69%; COx sel 29-31% and C2+ yield 22%. |
| 3 | (MR34-18)-VII | 2700 | 357 | 22 | 0.5 | 732-809 | 736-836 | CH4:O2:N2:H2O (2:1:1:4) | (MR34-18)-VII 41 cc/94 gr; ~1.41 mm | Single reactor c CH4 conv 19-41% and O2 conv 29-35% C2+ sel 63-69%; COx sel 29-35% and C2+ yield 26%. |
| 4 | (MR34-18)-VB | 2600 | 359 | 37 | 0.5 | 810-825 | 831-845 | CH4:O2:N2:H2O (2:1:1:4) | (MR34-18)-VB 25 cc/64 gr; ~1.41 mm | Single reactor c CH4 conv 47-49% and O2 conv 88-96% C2+ sel 56-59%; COx sel 39-41% and C2+ yield 28%. |

TABLE 11-continued

Effect of Feed Gas Composition, Flow Rate, Residency Times on Methane Oxidation to Ethylene

| Prep | Run No.* | GHSV 1/hr | Res t, ms* | L Vel cm/s | P psig | Taver C. | Tmax C. | Feed Composition | Catalyst | Remarks** |
|---|---|---|---|---|---|---|---|---|---|---|
| 5 | (MR34-18)-VIII | 2600 | 362 | 37 | 0.5 | 776-828 | 783-846 | $CH_4:O_2:N_2:H_2O$ (2:1:1:4) | (MR34-18)-VIII 25 cc/60 gr; ~1.41 mm | Single reactor d $CH_4$ conv 34-49% and $O_2$ conv 60-93% C2+ sel 57-66%; COx sel 32-40% and C2+ yield 28%. |
| 6 | (MR34-18)-X | 2600 | 373 | 36 | 0.6 | 728-777 | 747-830 | $CH_4:O_2:N_2:H_2O$ (2:1:1:4) | (MR34-18)-X 25 cc/51 gr; ~1.41 mm | Single reactor d $CH_4$ conv 21-38% and $O_2$ conv 64-96% C2+ sel 27-46%; COx sel 52-71% and C2+ yield 16%. |
| 7 | (MR34-18)-IV | 2600 | 353 | 31 | 0.5 | 710-837 | 719-845 | $CH_4:O_2:N_2:H_2O$ (2:1:1:4) | (MR34-18)-IV 25 cc/51 gr; ~1.41 mm | Single reactor d $CH_4$ conv 13-46% and $O_2$ conv 19-90% C2+ sel 52-70%; COx sel 23-46% and C2+ yield 24%. |
| 8 | (MR34-18)-XIII | 2600 | 358 | 27 | 0.5 | 764-830 | 773-843 | $CH_4:O_2:N_2:H_2O$ (2:1:1:4) | (MR34-18)-XIII 25 cc/45 gr; ~1.41 mm | Single reactor d $CH_4$ conv 34-48% and $O_2$ conv 66-97% C2+ sel 51-57%; COx sel 41-47% and C2+ yield 25%. |
| 9 | (MR34-18)-XII | 2600 | 356 | 38 | 0.5 | 763-839 | 769-847 | $CH_4:O_2:N_2:H_2O$ (2:1:1:4) | (MR34-18)-XII 25 cc/66 gr; ~1.41 mm | Single reactor d $CH_4$ conv 21-38% and $O_2$ conv 37-73% C2+ sel 57-63%; COx sel 34-41% and C2+ yield 13-22%. |
| 10 | (MR34-18)-XIIIB | 2600 | 357 | 31 | 0.5 | 763-839 | 769-847 | $CH_4:O_2:N_2:H_2O$ (2:1:1:4) | (MR34-18)-XIIIB 20 cc/52 gr; ~1.41 mm | Single reactor d $CH_4$ conv 22-38% and $O_2$ conv 16-55% C2+ sel 58-68%; COx sel 30-40% and C2+ yield 6-18%. |
| 11 | (MR34-18)-VII | 1800 | 534 | 25 | 0.6 | 786 | 801 | $CH_4:O_2:N_2:H_2O$ (2:1:1:4) | (MR34-18)-VII 25 cc/53 gr; ~1.41 mm | Single reactor d $CH_4$ conv 50% and $O_2$ conv 98% C2+ sel 56%; COx sel 42% and C2+ yield 28%. |
| 12 | MR47-1 | 2600 | 370 | 36 | 0.6 | 769-832 | 772-441 | $CH_4:O_2:N_2:H_2O$ (2:1:1:4) | MR47-I 25 cc/68 gr; ~1.41 mm | Single reactor d $CH_4$ conv 10-27% and $O_2$ conv 23-46% C2+ sel 41-62%; COx sel 36-49% and C2+ yield 4-17%. |
| 13 | (MR34-18)-XIV | 2600 | 371 | 39 | 0.5 | 758-829 | 767-843 | $CH_4:O_2:N_2:H_2O$ (2:1:1:4) | (MR34-18)-XIV 25 cc/68 gr; ~1.41 mm | Single reactor d $CH_4$ conv 23-47% and $O_2$ conv 39-91% C2+ sel 57-68%; COx sel 29-41% and C2+ yield 16-27%. |
| 14 | (MR34-18)-XIV | 1500 | 629 | 21 | 0.5 | 788-791 | 799-800 | $CH_4:O_2:N_2:H_2O$ (2:1:1:4) | (MR34-18)-XIV 25 cc/68 gr; ~1.41 mm | Single reactor d $CH_4$ conv 47-48% and $O_2$ conv 92-95% C2+ sel 55-56%; COx sel 41-42% and C2+ yield 24%. |
| 15 | (MR34-18)-VI | 2600 | 366 | 56 | 0.8 | 763-825 | 770-846 | $CH_4:O_2:N_2:H_2O$ (2:1:1:4) | (MR34-18)-VII 38 cc/71 gr; ~1.41 mm | Single reactor d $CH_4$ conv 31-51% and $O_2$ conv 52-97% C2+ sel 57-70%; COx sel 28-41% and C2+ yield 23-29%. |
| 16 | (MR34-18)-XIII-B#2 | 2600 | 361 | 37 | 0.6 | 772-827 | 787-843 | $CH_4:O_2:N_2:H_2O$ (2:1:1:4) | ((MR34-18)-XIII-B#2 25 cc/61 gr; ~1.41 mm | Single reactor d $CH_4$ conv 28-47% and $O_2$ conv 50-92% C2+ sel 56-66%; COx sel 31-41% and C2+ yield 18-27%. |

TABLE 11-continued

Effect of Feed Gas Composition, Flow Rate, Residency Times on Methane Oxidation to Ethylene

| Prep | Run No.* | GHSV 1/hr | Res t, ms* | L Vel cm/s | P psig | Taver C. | Tmax C. | Feed Composition | Catalyst | Remarks** |
|---|---|---|---|---|---|---|---|---|---|---|
| 17 | (MR34-18)-VII | 1500<br>4000<br>2600<br>3200 | 636<br>250<br>359<br>309 | 32<br>82<br>57<br>66 | 0.5<br>1.4<br>0.9<br>1.2 | 783-794 | 800-802 | CH4:O2:N2:H2O<br>(2:1:1:4) | (MR34-18)-VII<br>38 cc/71 gr;<br>~1.41 mm | Single reactor d<br>CH4 conv 31-50% and<br>O2 conv 48-99%<br>C2+ sel 56-72%;<br>C0x sel 26-42% and<br>C2+ yield 22-28%. |
| 18 | (MR34-18)-VII | 2600 | 372 | 55 | 0.9-1.0 | 794 | 801 | (3:1:1:4)<br>(3:1:1:8)<br>(4:1:1:8)<br>(4:1:1:2) | (MR34-18)-VII<br>38 cc/71 gr;<br>~1.41 mm | Single reactor d<br>CH4 conv 26-37% and<br>O2 conv 75-92%<br>C2+ sel 69-74%;<br>C0x sel 23-29% and<br>C2+ yield 19-26%. |
| 19 | (MR34-18)-VII | 1500<br>4000<br>2700<br>3200 | 647<br>262<br>377<br>323 | 32<br>78<br>54<br>64 | 0.6<br>1.8<br>1.3<br>1.6 | 766-771 | 776 | CH4:O2:N2:H2O<br>(2:1:1:4) | (MR34-18)-VII<br>38 cc/71 gr;<br>~1.41 mm | Single reactor d<br>CH4 conv 24-48% and<br>O2 conv 37-92%<br>C2+ sel 57-73%;<br>C0x sel 24-41% and<br>C2+ yield 17-27%. |
| 20 | (MR34-18)-VII | 4000<br>2600 | 263<br>385 | 78<br>53 | 2.6<br>1.7-1.8 | 815 | 825 | CH4:O2:N2:H2O<br>(2:1:1:4) | (MR34-18)-VII<br>38 cc/71 gr;<br>~1.41 mm | Single reactor d<br>CH4 conv 44-52% and<br>O2 conv 77-99%<br>C2+ sel 57-63%;<br>C0x sel 34-40% and<br>C2+ yield 28-30%. |
| 21 | (MR34-18)-XIII-B#3 | 2600 | 358 | 31 | 0.4 | 771-825 | 785-843 | CH4:O2:N2:H2O<br>(2:1:1:4) | (MR34-18)-XIII-B#3-C 20 cc/50 gr;<br>~1.41 mm | Single reactor d<br>CH4 conv 33-49% and<br>O2 conv 62-98%<br>C2+ sel 54-60%;<br>C0x sel 37-43% and<br>C2+ yield 20-27%. |
| 22 | (MR34-18)-XIII-B#3-C | 2600<br>3900 | 363<br>246 | 30<br>45 | 0.5<br>0.7 | 789 | 798 | CH4:O2:N2:H2O<br>(2:1:1:8) | ((MR34-18)-XIII-B#3-C 20 cc/50 gr;<br>~1.41 mm | Single reactor d<br>CH4 conv 32-45% and<br>O2 conv 52-86%<br>C2+ sel 58-68%;<br>C0x sel 30-40% and<br>C2+ yield 22-26%. |
| 23 | (MR34-18)-XV | 2600 | 358 | 38 | 0.5 | 769-827 | 775-842 | CH4:O2:N2:H2O<br>(2:1:1:4) | (MR34-18)-XV<br>25 cc/70 gr;<br>~1.41 mm | Single reacor d<br>CH4 conv 25-44% and<br>O2 conv 43-84%<br>C2+ sel 56-66%;<br>C0x sel 31-41% and<br>C2+ yield 17-25%. |
| 24 | (MR34-18)-XVI | 2600 | 363 | 37 | 0.7-0.8 | 770-823 | 778-846 | CH4:O2:N2:H2O<br>(2:1:1:4) | (MR34-18)-XVI<br>25 cc/69 gr;<br>~1.41 mm | Single reactor d<br>CH4 conv 30-48% and<br>O2 conv 52-95%<br>C2+ sel 56-66%;<br>C0x sel 32-42% and<br>C2+ yield 20-27%. |
| 25 | (MR34-18)-XVII | 2600 | 362 | 37 | 0.6-0.7 | 769-833 | 778-845 | CH4:O2:N2:H2O<br>(2:1:1:4) | (MR34-18)-XVII<br>25 cc/70 gr;<br>~1.41 mm | Single reacor d<br>CH4 conv 27-48% and<br>O2 conv 46-94%<br>C2+ sel 56-68%;<br>C0x sel 30-42% and<br>C2+ yield 18-27%. |
| 26 | (MR34-18)-XVII | 2600 | 362 | 37 | 0.6-0.8 | 769-832 | 779-846 | CH4:O2:N2:H2O<br>(2:1:1:4) | (MR34-18)-XVII<br>25 cc/70 gr;<br>~1.41 mm | Single reactor d<br>CH4 conv 30-48% and<br>O2 conv 49-94%<br>C2+ sel 55-68%;<br>C0x sel 30-43% and<br>C2+ yield 20-27%. |
| 27 | (MR34-18)-VII | 2600 | 368 | 37 | 0.5 | 745-792 | 756-800 | CH4:O2:N2:H2O<br>(2:1:1:4) | (MR34-18)-VII<br>25 cc/37 gr;<br>~1.41 mm | Single reactor d<br>CH4 conv 21-38% and<br>O2 conv 33-64%<br>C2+ sel 65-70%;<br>C0x sel 14-16% and<br>C2+ yield 14-24%. |
| 28 | (MR34-18)-VII | 1500<br>6000<br>3000<br>4500 | 624<br>163<br>317<br>215 | 22<br>83<br>43<br>63 | 0.4<br>1.1<br>0.7<br>0.9 | 791<br>791<br>792<br>793 | 801<br>802<br>801<br>801 | CH4:O2:N2:H2O<br>(2:1:1:4) | (MR34-18)-VII<br>25 cc/37 gr;<br>~1.41 mm | Single reactor d<br>CH4 conv 20-48% and<br>O2 conv 28-97%<br>C2+ sel 49-78%;<br>C0x sel 19-49% and<br>C2+ yield 16-25%. |

TABLE 11-continued

Effect of Feed Gas Composition, Flow Rate, Residency Times on Methane Oxidation to Ethylene

| Prep | Run No.* | GHSV 1/hr | Res t, ms* | L Vel cm/s | P psig | Taver C. | Tmax C. | Feed Composition | Catalyst | Remarks** |
|---|---|---|---|---|---|---|---|---|---|---|
| 29 | (MR34-18)-VII | 2600 | 363 | 37 | 0.9-1.0 | 792 | 801 | (2:1:1:4)<br>(2:1:1:6)<br>(2:1:1:8)<br>(2:1:1:10)<br>(2:1:1:12) | (MR34-18)-VII<br>25 cc/37 gr;<br>~1.41 mm | Single reactor d<br>CH4 conv 40-47% and<br>O2 conv 71-81%<br>C2+ sel 58-62%;<br>C0x sel 34-37% and<br>C2+ yield 24-28%. |
| 30 | (MR34-18)-VII | 2600 | 367<br>381<br>371<br>374 | 37<br>35<br>36<br>36 | 08<br>1.0<br>0.8<br>27 | 793<br>793<br>790<br>739 | 802<br>800<br>799<br>782 | (2:1:1:12)<br>(2:1:13:0)<br>(2:1:1:10)<br>(2:1:1:12) | (MR34-18)-VII<br>25 cc/37 gr;<br>~1.41 mm | Single reactor d<br>CH4 conv 20-46% and<br>O2 conv 22-80%<br>C2+ sel 63-80%;<br>C0x sel 18-35% and<br>C2+ yield 9-27%. |
| 31 | (MR34-18)-XVIII | 2600 | 383 | 35 | 1.1-16 | 780-808 | 795-825 | CH4:O2:N2:H2O<br>(2:1:1:4) | (MR34-18)-XVIII<br>25 cc/66 gr;<br>~1.41 mm | Single reactor d<br>CH4 conv 38-46% and<br>O2 conv 69-89%<br>C2+ sel 57-64%;<br>C0x sel 34-41% and<br>C2+ yield 24-27%. |
| 32 | (MR34-18)-VIII | 2600 | 364 | 37 | 0.5-0.6 | 791 | 801 | CH4:O2:N2:H2O<br>(2:1:1:4) | (MR34-18)-VIII<br>25 cc//55 gr;<br>~1.41 mm | Single reactor d<br>CH4 conv 37% and<br>O2 conv 55%<br>C2+ sel 66%;<br>C0x sel 31% and<br>C2+ yield 22%. |
| 33 | (MR34-18)-VIII | 2600<br>1500 | 364<br>625 | 37<br>21 | 0.5-0.6<br>0.4 | 790 | 800 | CH4:O2:N2:H2O<br>(2:1:1:4)<br>(2:1:1:12) | (MR34-18)-VIII<br>25 cc//55 gr;<br>~1.41 mm | Single reactor d<br>CH4 conv 34-46% and<br>O2 conv 58-89%<br>C2+ sel 52-66%;<br>C0x sel 32-45% and<br>C2+ yield 22-26%. |
| 34 | (MR34-18)-VIII | 1500<br>2600 | 625<br>916 | 22<br>14 | 0.4<br>24.5 | 791<br>774 | 801<br>786 | CH4:O2:N2:H2O<br>(2:1::1:12) | (MR34-18)-VIII<br>25 cc//55 gr;<br>~1.41 mm | Single reactor d<br>CH4 conv 40-46% and<br>O2 conv 66-100%<br>C2+ sel 41-62%;<br>C0x sel 32-53% and<br>C2+ yield 21-26%. |
| 35 | (MR34-18)-VIII | 1500<br>4300 | 365<br>365 | 21<br>21 | 0.4<br>28<br>Set | 791<br>785 | 800<br>797 | CH4:O2:N2:H2O<br>(2:1:1:12) | (MR34-18)-VIII<br>25 cc//55 gr;<br>~1.41 mm | Single reactor d<br>CH4 conv 43% and<br>O2 conv 89%<br>C2+ sel 50%;<br>C0x sel 48% and<br>C2+ yield 22%. |
| 36 | (MR34-18)-XIX | 2600 | 367 | 37 | 0.6-0.8 | 792 | 799 | CH4:O2:N2:H2O<br>(2:1:1:8) | (MR34-18)-XIX<br>25 cc//65 gr;<br>~1.41 mm | Single reactor d<br>CH4 conv 44% and<br>O2 conv 84%<br>C2+ sel 59%;<br>C0x sel 38% and<br>C2+ yield 26%. |
| 37 | (MR34-18)-XX | 2600 | 365-362 | 37 | 0.5 | 781-793 | 786-801 | CH4:O2:N2:H2O<br>(2:1:1:4) | (MR34-18)-XX<br>25 cc//59 gr;<br>~1.41 mm | Single reactor d<br>CH4 conv 30-37% and<br>O2 conv 58-68%<br>C2+ sel 62-61%;<br>C0x sel 35-37% and<br>C2+ yield 19-22%. |
| 38 | (MR34-18)-XX | 2600 | 365<br>368 | 37 | 0.6<br>0.7 | 793 | 801 | CH4:O2:N2:H2O<br>(2:1:1:4)<br>(2:1:1:8) | (MR34-18)-XX<br>25 cc//59 gr;<br>~1.41 mm | Single reactor d<br>CH4 conv 35-38% and<br>O2 conv 76-84%<br>C2+ sel 56-58%;<br>C0x sel 39-40% and<br>C2+ yield 23-26%. |
| 39 | (MR34-18)-XX | 2600<br>4500<br>6000 | 368<br>220<br>175 | 37<br>61<br>77 | 0.7<br>1.3<br>2.1 | 788<br>786<br>783 | 802<br>803<br>802 | CH4:O2:N2:H2O<br>(2:1:1:4) | (MR34-18)-XX<br>25 cc//59 gr;<br>~1.41 mm | 304 Single reactor d<br>CH4 conv 42-22% and<br>O2 conv 80-37%<br>C2+ sel 58-71%;<br>C0x sel 40-27% and<br>C2+ yield 24-16%. |
| 40 | (MR34-18)-XXI | 2600 | 365-358 | 37-38 | 0.6-0.7 | 792-824 | 800-839 | CH4:O2:N2:H2O<br>(2:1:1:4) | (MR34-18)-XXI<br>25 cc//63 gr;<br>~1.41 mm | Single reactor d<br>CH4 conv 41-49% and<br>O2 conv 78-96%<br>C2+ sel 60-56%;<br>C0x sel 38-42% and<br>C2+ yield 24-27%. |

TABLE 11-continued

Effect of Feed Gas Composition, Flow Rate, Residency Times on Methane Oxidation to Ethylene

| Prep | Run No.* | GHSV 1/hr | Res t, ms* | L Vel cm/s | P psig | Taver C. | Tmax C. | Feed Composition | Catalyst | Remarks** |
|---|---|---|---|---|---|---|---|---|---|---|
| 41 | (MR34-18)-XXI | 2600 | 372-376 | 36 | 0.9-0.1 | 786-800 | 800-826 | $CH_4:O_2:N_2:H_2O$ (2:1:1:4) | (MR34-18)-XXI 25 cc//63 gr; ~1.41 mm | Single reactor d CH4 conv 42-49% and O2 conv 83-94% C2+ sel 58-55%; C0x sel 40-41% and C2+ yield 24-27%. |
| 42 | (MR34-18)-XXI | 2600 3200 4000 4500 | 388 325 273 254 | 35 42 50 53 | 1.5 2.1 2.9 3.6 | 788 | 801 | $CH_4:O_2:N_2:H_2O$ (2:1:1:4) | (MR34-18)-XXI 25 cc//63 gr; ~1.41 mm | Single reactor d CH4 conv 43-31% and O2 conv 85-53% C2+ sel 57-66%; C0x sel 40-32% and C2+ yield 25-20%. |
| 43 | (MR34-18)-VII | 2600 3200 4000 4500 6000 | 364 296 242 214 167 | 37 45 56 63 80 | 0.5-1.5 | 791-794 | 799-801 | $CH_4:O_2:N_2:H_2O$ (2:1:1:4) | (MR34-18)-VII-2 25 cc//61 gr; ~1.41 mm | Single reactor d CH4 conv 41-23% and O2 conv 75-35% C2+ sel 61-73%; C0x sel 37-25% and C2+ yield 25-21%. |
| 44 | (MR34-18)-VII-2- | 2600 4000 6000 | 364 296 242 | 37 45 56 | 0.7-1.8 | 790-792 | 799-801 | $CH_4:O_2:N_2:H_2O$ (2:1:1:6) | (MR34-18)-VII-2 25 cc//61 gr; ~1.41 mm | Single reactor d CH4 conv 45-26% and O2 conv 83-40% C2+ sel 60-73%; C0x sel 37-24% and C2+ yield 27-21%. |
| 45 | (MR34-18)-VII-2 | 2600 | 395 | 35 | 1.5-2.0 | 791-810 | 800-825 | $CH_4:O_2:N_2:H_2O$ (2:1:1:6) | (MR34-18)-VII-2 25 cc//61 gr; ~1.41 mm | Single reactor d CH4 conv 46-50% and O2 conv 86-97% C2+ sel 59-56%; C0x sel 39-41% and C2+ yield 27-28%. |
| 46 | (MR34-18)-VII-2 | 2600 | 368 | 37 | 3.1-3.7 | 791-813 | 801-826 | $CH_4:O_2:N_2:H_2O$ (2:1:1:6) | (MR34-18)-VII-2 25 cc//61 gr; ~1.41 mm | Single reactor d CH4 conv 43-49% and O2 conv 78-91% C2+ sel 62-58%; C0x sel 36-39% and C2+ yield 27-28%. |
| 47 | (MR34-18)-XXII-02 | 2600 | 367 | 37 | 0.4 | 711-769 | 720-298 | $CH_4:O_2:N_2:H_2O$ (2:1:1:12) | (MR34-18)-XXII 25 cc//52 gr; ~1.41 mm | Single reactor d CH4 conv 21-30% and O2 conv 67-100% C2+ sel 17-12%; C0x sel 80-87% and C2+ yield 3-3.6%. |
| 48 | (MR34-18)-VII-2 | 2600 | 370-356 | 36-38 | 0.5-0.6 | 773-822 | 775-835 | $CH_4:O_2:N_2:H_2O$ (2:1:1:4) | (MR34-18)-VII-2 25 cc//44 gr; ~1.41 mm | Single reactor d CH4 conv 31-48% and O2 conv 56-93% C2+ sel 65-55%; C0x sel 33-43% and C2+ yield 20-26%. |
| 49 | (MR34-18)-VII-2 | 2600 3200 4500 6000 | 362 296 214 165 | 37 46 63 83 | 0.5 0.7 0.9 1.2 | 790-795 | 800 | $CH_4:O_2:N_2:H_2O$ (2:1:1:4) | (MR34-18)-VII-2 25 cc//44 gr; ~1.41 mm | Single reactor d CH4 conv 41-20% and O2 conv 72-27% C2+ sel 61-77%; C0x sel 66-21% and C2+ yield 25-16%. |
| 50 | (MR34-18)-VII-2 | 2600 2600 4000 6000 | 365 367 243 166 | 37-81 | 0.6 0.6 0.9 1.4 | 793-796 | 799-800 | $CH_4:O_2:N_2:H_2O$ (2:1:1:4) (2:1:1:6) | (MR34-18)-VII-2 25 cc//44 gr; ~1.41 mm | Single reactor d CH4 conv 42-25% and O2 conv 75-36% C2+ sel 60-76%; C0x sel 39-22% and C2+ yield 25-19%. |
| 51 | (MR34-18)-VII-2 | 2600 2600 4000 6000 | 367 367 243 169 | 37-80 | 0.7 0.7 1.0 1.6 | 793-794 | 800-801 | $CH_4:O_2:N_2:H_2O$ (2:1:1:4) (3:1:1:6) | (MR34-18)-VII-2 25 cc//44 gr; ~1.41 mm | Single reactor d CH4 conv 42-20% and O2 conv 76-40% C2+ sel 60-79%; C0x sel 38-19% and C2+ yield 25-16%. |

TABLE 11-continued

Effect of Feed Gas Composition, Flow Rate, Residency Times on Methane Oxidation to Ethylene

| Prep | Run No.* | GHSV 1/hr | Res t, ms* | L Vel cm/s | P psig | Taver C. | Tmax C. | Feed Composition | Catalyst | Remarks** |
|---|---|---|---|---|---|---|---|---|---|---|
| 52 | (MR34-18)-VII-2 | 2600<br>2600<br>2600 | 374<br>376<br>372 | 36<br>36<br>36 | 0.9<br>0.9<br>1.0 | 794<br>794<br>813 | 801<br>800<br>826 | (2:1:1:4)<br>(2:1:1:6)<br>(2:1:1:6) | (MR34-18)-VII-2<br>25 cc//44 gr;<br>~1.41 mm | Single reactor d<br>CH4 conv 43-50% and<br>O2 conv 52-96%<br>C2+ sel 60-55%;<br>COx sel 33-43% and<br>C2+ yield 19-27%. |
| 53 | (MR34-18)-VII-2 | 2600 | 360 | 38 | 1.2-1.3 | 794-815 | 800-826 | CH4:O2:N2:H2O (2:1:1:6) | (MR34-18)-VII-2<br>25 cc//44 gr;<br>~1.41 mm | Single reactor d<br>CH4 conv 41-50% and<br>O2 conv 72-94%<br>C2+ sel 61-56%;<br>COx sel 37-42% and<br>C2+ yield 25-28%. |
| 54 | ((MR34-18)-VII-2C- | 1800<br>2700<br>4300 | 535<br>362<br>247 | 38<br>56<br>83 | 0.9<br>1.3<br>2.3 | 791-787 | 798-801 | CH4:O2:N2:H2O (2:1:1:4) | (MR34-18)-VII-2C<br>38 cc//95 gr;<br>~1.41 mm | Single reactor d<br>CH4 conv 49-29% and<br>O2 conv 95-56%<br>C2+ sel 58-73%;<br>COx sel 40-25% and<br>C2+ yield 28-21%. |
| 55 | (MR34-18)-XXIII | 2600 | 363 | 37 | 0.5 | 780-794 | 785-801 | CH4:O2:N2:H2O (2:1:1:4) | (MR34-18)-XXIII<br>25 cc//60 gr;<br>~1.41 mm | Single reactor d<br>CH4 conv 29-34% and<br>O2 conv 56-64%<br>C2+ sel 62-61%;<br>COx sel 36-37% and<br>C2+ yield 18-21%. |
| 56 | (MR34-18)-XXIII | 2600<br>4000<br>6200 | 361<br>237<br>160 | 37<br>57<br>84 | 0.6<br>0.8<br>1.2 | 795-791 | 800 | CH4:O2:N2:H2O (2:1:1:4) | (MR34-18)-XXIII<br>25 cc//60 gr;<br>~1.41 mm | Single reactor d<br>CH4 conv 34-17% and<br>O2 conv 59-22%<br>C2+ sel 61-73%;<br>COx sel 36-27% and<br>C2+ yield 21-12%. |
| 57 | (MR34-18)-XXIII | 2600<br>4000 | 365<br>242 | 37<br>57 | 0.7<br>0.9 | 794 | 800 | CH4:O2:N2:H2O (2:11:6) | (MR34-18)-XXIII<br>25 cc//60 gr;<br>~1.41 mm | Single reactor d<br>CH4 conv 38-29% and<br>O2 conv 67-46%<br>C2+ sel 62-69%;<br>COx sel 36-29% and<br>C2+ yield 23-20%. |
| 58 | (MR34-18)-XXIII | 2600 | 371 | 37 | 0.8 | 794 | 799 | CH4:O2:N2:H2O (2:1:1:12) | (MR34-18)-XXIII<br>25 cc//60 gr;<br>~1.41 mm | Single reactor d<br>CH4 conv 43% and<br>O2 conv 77%<br>C2+ sel 61%;<br>COx sel 37% and<br>C2+ yield 26%. |
| 59 | (MR34-18)-XIV- | 2600 | 363 | 37 | 0.5 | 768-792 | 775-800 | CH4:O2:N2:H2O (2:1:1:4) | (MR34-18)-XIV<br>25 cc//61 gr;<br>~1.41 mm | Single reactor d<br>CH4 conv 34-37% and<br>O2 conv 54-70%<br>C2+ sel 19-23%;<br>COx sel 34-37% and<br>C2+ yield 19-23%. |

*Res t (ms) = Residence time, in milliseconds.
**Remarks.
Reactor a = Single titanium reactor, 12.6 mm inner diameter, with 3 mm 304 stainless steel thermowell.
Reactor b = Dual titanium reactors, 12.6 mm inner diameter, each with 3 mm 304 stainless steel thermowell.
Reactor c = Single 1.25 inch (31.8 mm) outer diameter 304 stainless steel reactor with 3 mm 304 stainless steel thermowell.
Reactor d = Single 0.75 inch (19.1 mm) outer diameter 304 stainless steel reactor with 3 mm 304 stainless steel thermowell.

Example 14

Effect of Silicon Nitride on Catalytic Activity

These experiments utilized a single stainless steel reactor with a stainless steel thermowell. The feed gas composition was the same as described in Example 13 above (generally $CH_4:O_2:N_2:H_2O$ of 2:1:1:4). Catalyst MR-34-18-VII that had been calcined at about 840 degrees C. for 24 hours was dry-blended with silicon nitride ($Si_3N_4$). The blended mixture was pelletized, granulized and sieved as described in previous Examples, and then annealed to 1000 degrees C. for about 8 hours. The mixture was then tested in a single reactor system for its activity to oxidize methane as described in previous Examples. The results show that yields of $C_{2+}$ products in excess of 20% were obtained.

| Sample | Res T, ms | $CH_4$ Conversion % | $C_{2+}$ Selectivity % | $C_{2+}$ Yield % |
|---|---|---|---|---|
| 1 | 394 ms | 36 | 67 | 24 |
| 2 | 396 | 26 | 68 | 18 |
| 3 | 732 | 48 | 57 | 28 |

Additional data shown in Table 12 indicates that the catalyst embodiments were effective in large size reactors (preps. 62 and 64) and in small size reactors (preps. 63 and 65).

Catalytic reactions occurring with a residence time of greater than 700 ms produced yields of $C_{2+}$ compounds of about 28%, and a slightly lesser yield of $C_2$ (2 carbon) compounds.

The various admixtures were dry blended to contain the catalyst composition and $Si_3N_4$) in ratios ranging from 90:10, 80:20 and 50:50, on a weight:weight basis.

$$CO+H_2O \rightleftharpoons CO_2+H_2 \tag{4A}$$

$$CH_4+O_2 \rightarrow CO+H_2+H_2O \tag{5A}$$

$$CH_4+1.5O_2 \rightarrow CO+2H_2O \tag{6A}$$

$$CH_4+2O_2 \rightarrow CO_2+2H_2O \tag{7A}$$

TABLE 12

Effects of Silicon Nitride blended catalysts on oxidation of methane.

| Prep | Run No.* | GHSV 1/hr | Res t, ms* | L Vel cm/s | P psig | Taver C. | Tmax C. | Feed Composition | Catalyst | Remarks** | |
|---|---|---|---|---|---|---|---|---|---|---|---|
| 60 | (MR34-18)-VII mixed with $Si_3N_4$ (80:20, wt:wt) | 2600 | 430 | 63 | 1.5 | 686 | 705 | CH4:O2:N2:H2O (2:1:1:4) | (MR34-18)-VII-$Si_3N_4$ 101 cc//168 gr; ~1.41 mm | Single reactor c C2 Sel, % C2+ Sel, % C3+ Sel, % C2 Yield, % C2+ Yield, % | 59.12 60.38 1.27 5.92 6.05 |
| 61 | (MR34-18)-VII mixed with $Si_3N_4$ (80:20, wt:wt) | 2600 | 400 | 66 | 1.5 | 745 | 768 | CH4:O2:N2:H2O (2:1:1:4) | (MR34-18)-VII with $Si_3N_4$ 50 cc//93 gr; ~1.41 mm | Single reactor d C2 Sel, % C2+ Sel, % C3+ Sel, % C2 Yield, % C2+ Yield, % | 66.16 70.38 4.23 15.44 16.43 |
| 62 | (MR34-18)-VII mixed with $Si_3N_4$ (80:20, wt:wt) | 2600 | 400 | 68 | 1.5 | 781 | 803 | CH4:O2:N2:H2O (2:1:1:4) | (MR34-18)-VII with $Si_3N_4$ 101 cc//168 gr; ~1.41 mm | Single reactor c C2 Sel, % C2+ Sel, % C3+ Sel, % C2 Yield, % C2+ Yield, % | 62.49 68.09 5.60 21.35 23.27 |
| 63 | (MR34-18)-VII mixed with $Si_3N_4$ (80:20, wt:wt) | 2600 | 400 | 68 | 1.5 | 781 | 799 | CH4:O2:N2:H2O (2:1:1:4) | (MR34-18)-VII with $Si_3N_4$ 50 cc//93 gr; ~1.41 mm | Single reactor d C2 Sel, % C2+ Sel, % C3+ Sel, % C2 Yield, % C2+ Yield, % | 60.11 68.60 8.49 21.35 24.37 |
| 64 | (MR34-18)-VII mixed with $Si_3N_4$ (80:20, wt:wt) | 1325 | 740 | 37 | 0.8 | 777 | 788 | CH4:O2:N2:H2O (2:1:1:4) | (MR34-18)-VII with $Si_3N_4$ 101 cc//168 gr; ~1.41 mm | Single reactor c C2 Sel, % C2+ Sel, % C3+ Sel, % C2 Yield, % C2+ Yield, % | 53.09 60.00 6.91 24.49 27.68 |
| 65 | (MR34-18)-VII mixed with $Si_3N_4$ (80:20, wt:wt) | 1325 | 730 | 37 | 0.8 | 783 | 803 | CH4:O2:N2:H2O (2:1:1:4) | (MR34-18)-VII with $Si_3N_4$ 50 cc//93 gr; ~1.41 mm | Single reactor d C2 Sel, % C2+ Sel, % C3+ Sel, % C2 Yield, % C2+ Yield, % | 51.81 58.77 6.96 24.78 28.11 |

*Res t (ms) = Residence time, in milliseconds.
**Remarks.
Reactor c = Single 1.25 inch (31.8 mm) outer diameter 304 stainless steel reactor with 3 mm 304 stainless steel thermowell.
Reactor d = Single 0.75 inch (19.1 mm) outer diameter 304 stainless steel reactor with 3 mm 304 stainless steel thermowell.

As we described in a previous section for the single reactor OCM system, there are a number of reactions occurring among the components of the system, exemplified in Equations (1) through (18).

In the single or two-reactor system, the apparent stoichiometric kinetic sequence can be described by the following series of equations:

$$2CH_4+0.5O_2 \rightarrow C_2H_6+H_2O \tag{1A}$$

$$C_2H_6+0.5O_2 \rightarrow C_2H_4+H_2O \tag{2A}$$

$$C_2H_6 \rightarrow C_2H_4+H_2 \tag{3A}$$

FIGS. 4 and 6 do not provide any insight as to whether ethylene is produced from Reactions (2A) or (3A). The reactor effluent contains some hydrogen, which might also be produced from the water gas shift reaction, Reaction (4A) below, since the feed contains a high concentration of steam. At reaction conditions the equilibrium constant for Reaction (4A) is approximately one.

$$C_2H_6+2.5O_2 \rightarrow 2CO+3H_2O \tag{8A}$$

$$C_2H_4+2O_2 \rightarrow 2CO+2H_2O \tag{9A}$$

$$CO+0.5O_2 \rightarrow CO_2 \tag{10A}$$

$$H_2+O_2 \rightarrow H_2O \tag{11A}$$

Reactions (5A) through (11A) are a set of undesirable side reactions, and the negative slope of the C2 and C2+ selectivities in FIGS. 4 and 6 suggest the majority of the COx is produced from Reactions (8A) and/or (9A). Extrapolation to zero methane conversions of the trend lines for the selectivities of $C_2$ and $C_{2+}$ produces non zero intercepts, and since selectivities for $CO_x$ is approximately equal to 0.98-Sel $C_{2+}$, some of the carbon oxides are produced as primary reactions, Reactions (6A) and (7A). Extrapolation of the trend lines to zero methane conversions predicts a maximum of selectivity of $C_{2+}$ in the neighborhood of 75 to 80%. However, FIGS. 5 and 6, which are plots of the data for temperatures with Tmax~800° C. and Tmax~835° C. indicate initial selectivities for $C_{2+}$ greater than 80%.

We claim:

1. A composition for the oxidative reforming of hydrocarbons, the composition comprising:
    a catalyst having the formula $M_1$, W, Mn $O_x$ wherein
    $M_1$ is cobalt, and the cobalt comprises from about 0.03 mol to about 1 mol;
    W is tungsten, and W comprises from about 0.01 mol to less than about 2 mol;
    Mn is manganese, and Mn comprises from about 0.3 mol to less than 3 mol;
    O is oxygen; and
    X is a quantity from about 0.1 to about 4.

2. The composition as described in claim 1, wherein the cobalt comprises from about 0.2 mol to about 1 mol.

3. The composition as described in claim 2, wherein the cobalt comprises from about 0.2 mol to about 0.3 mol.

4. The composition as described in claim 3, wherein the tungsten comprises from about 0.1 mol to about 1 mol.

5. The composition as described in claim 1, wherein the manganese comprises from about 0.5 mol to less than about 2 mol.

6. The composition as described in claim 4, wherein the manganese comprises from about 0.5 mol to about 1.5 mol.

7. A composition for the oxidative reforming of hydrocarbons, the composition comprising:
    a catalyst having the formula $M_1$, W, Mn $O_x$ wherein
    $M_1$ is cobalt, and the cobalt comprises from about 0.03 mol to about 0.5 mol;
    W is tungsten, and W comprises from about 0.01 mol to less than about 2 mol;
    Mn is manganese, and Mn comprises from about 0.3 mol to less than 3 mol;
    O is oxygen; and
    X is a quantity from about 0.1 to about 4.

* * * * *